US011634118B2

(12) United States Patent
Yamanaka et al.

(10) Patent No.: US 11,634,118 B2
(45) **Date of Patent: *Apr. 25, 2023**

(54) PARKING CONTROL METHOD AND PARKING CONTROL APPARATUS

(71) Applicant: Nissan Motor Co., Ltd., Yokohama (JP)

(72) Inventors: Ryota Yamanaka, Kanagawa (JP); Yasuhiro Suzuki, Kanagawa (JP); Yasuhisa Hayakawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 276 days.

This patent is subject to a terminal disclaimer.

(21) Appl. No.: 16/954,243

(22) PCT Filed: Dec. 20, 2017

(86) PCT No.: PCT/JP2017/045817

§ 371 (c)(1),
(2) Date: Jun. 16, 2020

(87) PCT Pub. No.: WO2019/123585

PCT Pub. Date: Jun. 27, 2019

(65) Prior Publication Data

US 2020/0406889 A1 Dec. 31, 2020

(51) Int. Cl.

| | |
|---|---|
| ***B60W 30/06*** | (2006.01) |
| ***G01C 21/34*** | (2006.01) |
| ***G05D 1/00*** | (2006.01) |

(52) U.S. Cl.
CPC ......... *B60W 30/06* (2013.01); *G01C 21/3407* (2013.01); *G05D 1/0011* (2013.01)

(58) Field of Classification Search
CPC . B60W 30/06; G01C 21/3407; G05D 1/0011; G06V 20/586; B60R 21/00; G08G 1/16
See application file for complete search history.

(56) References Cited

U.S. PATENT DOCUMENTS 6,170,591 B1 * 1/2001 Sakai ................ B62D 15/0285 180/204
2015/0353080 A1 * 12/2015 Mukaiyama ........... E05B 77/54 701/23

(Continued)

FOREIGN PATENT DOCUMENTS

DE 112014003229 * 6/2014 ........... B60W 30/60
JP 2008-074296 A 4/2008

(Continued)

*Primary Examiner* — Jeff A Burke
*Assistant Examiner* — Sihar A Karwan
(74) *Attorney, Agent, or Firm* — Young Basile Hanlon & MacFarlane, P.C.

(57) ABSTRACT

A parking control method includes: performing parking control of moving a vehicle to a target parking position on the basis of an operation command acquired from an operator located outside the vehicle; when the parking control to the target parking position is suspended and the vehicle leaves the target parking position, calculating a moving direction of the vehicle on the basis of a parking direction when the vehicle is parked at a next target parking position; and moving the vehicle in the moving direction.

10 Claims, 15 Drawing Sheets

(56) References Cited

U.S. PATENT DOCUMENTS

| | | | | |
|---|---|---|---|---|
| 2016/0144857 | A1* | 5/2016 | Ohshima | G08G 1/207 |
| | | | | 701/23 |
| 2020/0298835 | A1* | 9/2020 | Suzuki | G05D 1/0225 |
| 2020/0324816 | A1* | 10/2020 | Edling | G08G 1/168 |

FOREIGN PATENT DOCUMENTS

| | | | | | |
|---|---|---|---|---|---|
| JP | 2011-042356 | A | | 3/2011 | |
| JP | 2014-054912 | A | | 3/2014 | |
| JP | 201423057 | A | * | 5/2016 | B60W 30/06 |
| JP | 2017-007399 | A | | 1/2017 | |
| JP | 2017067466 | A | * | 4/2017 | G01C 21/34 |
| KR | 20120035122 | | * | 4/2012 | B62D 15/028 |
| WO | 2017/168754 | A1 | | 10/2017 | |

* cited by examiner

PL2
R_PL2
P_R
V'
Pa
R_R
V
OB
PL1

PL3
CR2
$R_{PL3}$
$P_{R2}$
V'
$R_{R2}$
V
M,5
OB
PL2
PL1

PARKING CONTROL METHOD AND PARKING CONTROL APPARATUS

TECHNICAL FIELD

The present invention relates to a parking control method and a parking control apparatus.

BACKGROUND

A technique for an operator to remotely operate a vehicle is known, in which when the vehicle is parked into a parking space, the vehicle is controlled to make a stop if an obstacle is detected (JP2008-74296A).

In the above prior art, after the vehicle makes a stop due to the detection of an obstacle, the operator has to give an instruction or the like for the next parking direction in order to park the vehicle into the next parking space, which may impose a burden on the operator.

A problem to be solved by the present invention is to alleviate the burden imposed on an operator by preliminarily moving a vehicle in a direction based on the next parking direction even when a determination is once made that parking is not possible and the vehicle leaves a target parking position.

SUMMARY

The present invention solves the above problem through, when parking control to a target parking position is suspended and the vehicle leaves the target parking position, calculating a moving direction of the vehicle on the basis of a parking direction when the vehicle is parked at a next target parking position and moving the vehicle on the basis of the calculated moving direction.

According to the present invention, even when a determination is once made that parking is not possible and the vehicle leaves the target parking position, the vehicle is preliminarily moved in a direction based on the next parking direction and it is therefore possible to prevent the operator from giving an instruction or the like for the next parking direction and alleviate the burden imposed on the operator.

DETAILED DESCRIPTION

Hereinafter, one or more embodiments of the present invention will be described with reference to the drawings.

In the embodiments, the present invention will be described by exemplifying a case in which the parking control apparatus according to the present invention is applied to a parking control system. One or more embodiments of the present invention will be described with reference to a configuration in which the parking control apparatus is equipped in a vehicle, but the parking control apparatus may also be applied to a portable operation terminal (equipment such as a smartphone or a PDA: Personal Digital Assistant) capable of exchanging information with an onboard apparatus. The parking control method according to the present invention can be used in the parking control apparatus, which will be described below.

Figure 1:
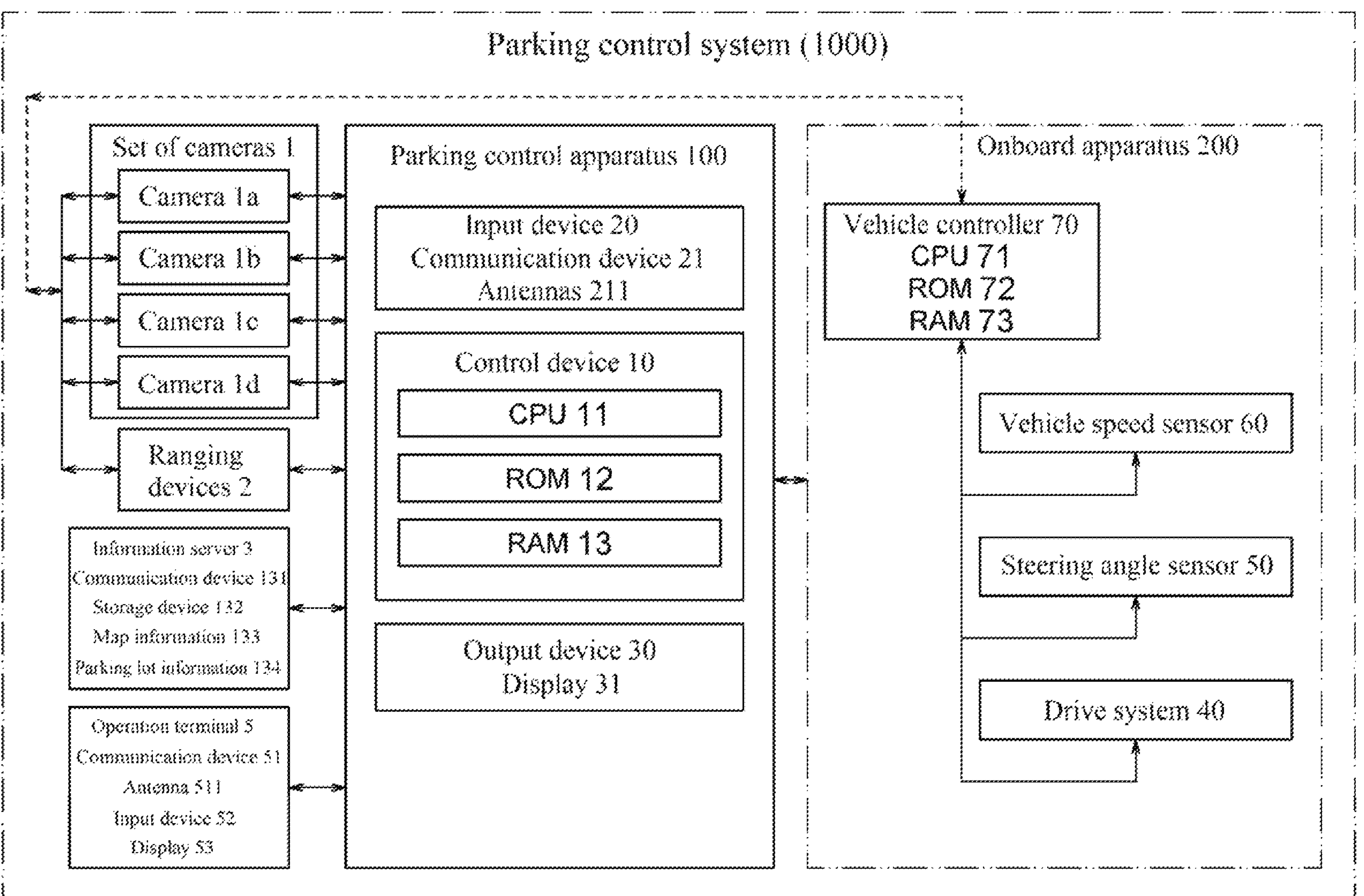
FIG. 1 is a block diagram illustrating an example of a parking control system according to one or more embodiments of the present invention.

FIG. 1 is a block diagram of a parking control system 1000 including a parking control apparatus 100 according to one or more embodiments of the present invention. The parking control system 1000 according to one or more embodiments of the present invention includes a set of cameras 1, one or more ranging devices 2, an information server 3, an operation terminal 5, the parking control apparatus 100, and an onboard apparatus 200. The onboard apparatus 200 includes a vehicle controller 70, a drive system 40, a steering angle sensor 50, and a vehicle speed sensor 60. The parking control apparatus 100 according to one or more embodiments of the present invention controls an operation of moving (parking) a vehicle as the target of control into a parking space on the basis of an operation command that is input from the operation terminal 5.

The set of cameras 1 includes, for example, cameras 1*a* to 1*d* as illustrated. The cameras 1*a* to 1*d* are installed at the front part, right-side part, left-side part, and rear part of the vehicle, respectively. For example, the camera 1*a*, which is installed at or near the front bumper of the vehicle, captures an image ahead of the vehicle and outputs the image information to the parking control apparatus 100. The camera 1*b*, which is installed on the right side of the vehicle (e.g., on the right side of the front end of the vehicle), captures an image on the right side of the vehicle and outputs the image information to the parking control apparatus 100. The camera 1*c*, which is installed on the left side of the vehicle (e.g., on the left side of the front end of the vehicle), captures an image on the left side of the vehicle and outputs the image information to the parking control apparatus 100. The camera 1*d*, which is installed at or near the rear bumper of the vehicle, captures an image behind the vehicle and outputs the image information to the parking control apparatus 100.

The one or more ranging devices 2 measure the distance from the vehicle to an object existing around the vehicle. Examples of the ranging devices 2 include radar devices, such as a millimeter-wave radar device, a laser radar device, and an ultrasonic radar device, and sonar devices. The number of the ranging devices 2 is not particularly limited and the ranging devices 2 may thus be two or more ranging devices 2. The ranging devices 2 may be installed at the same positions as the cameras 1*a* to 1*d* of the set of cameras 1 or may also be provided at different positions. Objects existing around the vehicle include obstacles, pedestrians, and other vehicles. The ranging devices 2 detect not only the distance to an object but also the presence or absence of the object and the position of the object with respect to the vehicle. The ranging devices 2 detect the presence or absence of an object, the distance to the object, and the position of the object and outputs the detection results to the parking control apparatus 100.

The information server 3 is an information provision apparatus provided on a network capable of communication. The information server includes a communication device 131 and a storage device 132. The storage device 132 includes readable map information 133 and parking lot information 134. The map information 133 includes positional information of parking facilities. The parking lot information 134 includes, for each parking facility, the location and identification number of each parking lot and positional information of passages, pillars, walls, storage spaces, etc. in the parking facility. The parking lot information 134 further includes the traffic direction of vehicles in a passage of the parking facility. The parking lot information 134 is not limited to the above information and may include, for each parking facility, information on available parking spaces as information on parking lots in which the vehicle can be parked. The parking control apparatus 100 and the operation terminal 5 can access the storage device 132 of the information server 3 to acquire various information items.

The operation terminal 5 is a portable computer that can be brought out to outside of the vehicle and has an input function and a communication function. The operation terminal 5 receives the input of an operation command made by an operator for controlling the driving (operation) of the vehicle for parking. The driving includes operations for parking (operations for entering a parking space and exiting the parking space). The operator inputs instructions via the operation terminal 5. The instructions include an operation command for execution of parking. The operation command includes information on the execution/stop of parking control, selection/change of a target parking position, and selection/change of a parking route and other information necessary for parking. The operator can also make the parking control apparatus 100 recognize the instructions including the operation command without using the operation terminal 5, such as by a gesture of the operator (i.e., the operator can input such instructions to the parking control apparatus 100 without using the operation terminal 5, such as by a gesture).

The operation terminal 5 includes a communication device and is capable of exchanging information with the parking control apparatus 100 and the information server 3. The operation terminal 5 transmits the operation command, which is input outside the vehicle, to the parking control apparatus 100 via a communication network and inputs the operation command to the parking control apparatus 100. The operation terminal 5 communicates with the parking control apparatus 100 using signals including a unique identification code. The operation terminal 5 includes a display 53. The display 53 presents an input interface and various information items. When the display 53 is a touch panel-type display, it has a function of receiving the operation command. The operation terminal 5 may be portable equipment, such as a smartphone or a PDA: Personal Digital Assistant, in which applications are installed for receiving an input of the operation command used in the parking control method according to one or more embodiments of the present invention and transmitting the operation command to the parking control apparatus 100.

The vehicle controller 70 is a controller that controls driving of the vehicle. Examples of the vehicle controller 70 include a computer and an electronic control unit (ECU). The vehicle controller 70 includes a ROM 72 that stores a vehicle drive control program, a CPU 71 as an operation circuit that executes the program stored in the ROM 72 to serve as a drive control device, and a RAM 73 that serves as an accessible storage device. The target steering angle and target speed of the vehicle are input from the parking control apparatus 100 to the vehicle controller 70, and the detection value from the steering angle sensor 50 and the detection value from the vehicle speed sensor 60 are input to the vehicle controller 70. When executing the control of parking the vehicle, the vehicle controller 70 controls the operation of the drive system 40 on the basis of the target steering angle and the target speed which are input to the parking control apparatus 100. The vehicle controller 70 outputs the detection value from the steering angle sensor 50 and the detection value from the vehicle speed sensor 60 to the parking control apparatus 100. The target steering angle and target speed of the vehicle, which are input from the parking control apparatus 100, will be described later.

The drive system 40 operates the vehicle to move (travel) from the current position to the target parking position by driving based on the control command signal acquired from the parking control apparatus 100 via the vehicle controller 70. The steering device (not illustrated) according to one or more embodiments of the present invention is a drive mechanism that moves the vehicle in the right or left direction. The drive system 40 includes an EPS motor. The EPS motor acquires the control command signal from the parking control apparatus 100 via the vehicle controller 70. Then, the EPS motor controls the steering amount by driving a power steering mechanism included in the steering of the steering device on the basis of the acquired control command signal and controls the operation when moving the vehicle to the target parking position. The control content and operation scheme for parking the vehicle are not particularly limited, and schemes known at the time of filing the present application can be appropriately applied.

The steering angle sensor 50, which is installed inside the steering column, for example, detects the rotation angle of the steering wheel and outputs the detected value to the parking control apparatus 100 via the vehicle controller 70. The vehicle speed sensor 60 calculates the vehicle speed of the vehicle from the wheel speed detected by a wheel-side sensor (not illustrated) that detects the rotational speed of the wheel, and outputs the detected value to the parking control apparatus 100 via the vehicle controller 70.

The parking control apparatus 100 according to one or more embodiments of the present invention includes a control device 10, an input device 20, and an output device 30. These components of the parking control apparatus 100 are connected to one another via a controller area network (CAN) or other onboard LAN to mutually exchange information. The input device 20 includes a communication device 21. The communication device 21 receives the operation command transmitted from the external operation terminal 5 and inputs the received operation command to the input device 20. The subject who inputs the operation command to the external operation terminal 5 may be a person (a user, a passenger, a driver, or a worker of a parking facility). The input device 20 transmits the received operation command to the control device 10. The output device 30 includes a display 31. When an occupant (driver or passenger) is present in the vehicle, the output device 30 can notifies the occupant in the vehicle of the parking control information via the display 31. Additionally or alternatively, the output device 30 can transmit the parking control information to the operation terminal 5 and notify the operator carrying the operation terminal 5 of the parking control information via the display 53 of the operation terminal 5. The display 31 according to one or more embodiments of the present invention is a touch panel-type display having an input function and an output function. When the display 31 has an input function, it serves as the input device 20. Even when the vehicle is controlled based on the operation command which is input from the operation terminal 5, an occupant (driver or passenger) can input the operation command, such as a command for emergency stop, via the input device 20.

The control device 10 of the parking control apparatus 100 according to one or more embodiments of the present invention is a computer for parking control including a ROM 12 that stores a parking control program, a CPU 11 as an operation circuit that executes the program stored in the ROM 12 to serve as the parking control apparatus 100 according to one or more embodiments of the present invention, and a RAM 13 that serves as an accessible storage device.

The parking control program according to one or more embodiments of the present invention is a program for performing the parking control of moving the vehicle to the target parking position on the basis of the operation command transmitted from the external operation terminal 5. The parking control apparatus 100 outputs the target speed and target steering angle of the vehicle, which are calculated by the program, to the vehicle controller 70. The vehicle controller 70 operates the drive system 40 in accordance with the target speed and target steering angle, and the vehicle can thereby move along the parking route at an appropriate speed to park at the target parking position.

Additionally or alternatively, the parking control program according to one or more embodiments of the present invention is a program for moving the vehicle in a direction in which the vehicle leaves the target parking position when the vehicle cannot be parked at the target parking position for some reason while moving to park at the target parking position. For example, when the set of cameras 1 or the like detects an obstacle on or near the parking route, the parking control apparatus 100 suspends the parking control. Then, to allow the operator to select whether or not the vehicle control should transition from the parking control to a rescue mode, the parking control apparatus 100 transmits to the operation terminal 5 information that the parking control will be suspended and information with which the operator can select the rescue mode.

The rescue mode refers to a so-called return mode in which when the vehicle is put into a situation that the vehicle cannot be parked at the target parking position during execution of the parking control to the target parking position, the parking control is suspended and the vehicle is moved to a given position separated from the target parking position. Specific processing after transition to the rescue mode will be described later. In the above-described example, when the operator touches a button on the screen for executing the rescue mode displayed on the screen of the display 53 of the operation terminal 5, operation command information for executing the rescue mode is input as an operation command for executing the rescue mode to the parking control apparatus 100 via the communication network, and the program of the rescue mode is executed.

The parking control apparatus 100 according to one or more embodiments of the present invention is a remote control-type apparatus that receives the operation command from outside and controls the movement of the vehicle to park the vehicle into a given parking space. Occupants of the vehicle may be located outside the vehicle interior or may also be located inside the vehicle interior.

The control device 10 of the parking control apparatus 100 according to one or more embodiments of the present invention has functions of executing a target parking frame setting process, a parking start position setting process, a current position estimation process, an operator position detection process, and a parking route generation process as the functions of executing the above-described parking control. In addition, the control device 10 has functions of executing an obstacle detection process, a deceleration process, a next parking direction calculation process, and a rescue route generation process as the functions of executing the above-described rescue mode. The control device 10 further has functions of executing a route following process and a target speed generation process to move the vehicle along the parking route generated by the parking route generation process or along the rescue route generated by the rescue route generation process. The rescue route will be described later. Each of the above processes is executed by cooperation of software for implementing the process and the above-described hardware. These processes will be described below.

First, the functions of executing the parking control will be described. The target parking frame setting process will be described. The control device 10 sets a parking frame for parking the vehicle by automated (autonomous) driving (referred to as a target parking frame, hereinafter). The control device 10 detects parking frames in the parking lot from the images captured by the set of cameras 1. For example, the control device 10 generates an overhead view image from the images captured by the set of cameras 1 and detects frame line candidates that consist each parking frame from the overhead view image. Then, the control device 10 determines whether or not the detected frame line candidates satisfy determination conditions for the interval with another frame line, the relative angle to another frame line, the length, etc., and detects spaces defined by the frame line candidates satisfying the above determination conditions as the parking frames. The present invention is not limited to generating the overhead view image from the images captured by the set of cameras 1 to detect the parking frames from the overhead view image, and information on the parking frames may be acquired, for example, through communication with outside of the vehicle, that is, so-called road-to-vehicle communication or vehicle-to-vehicle communication.

Here, the automated (autonomous) driving refers to driving in which the parking control apparatus 100, rather than the driver, performs the steering operation of the steering device, the accelerator operation, and the brake operation in an automated (autonomous) manner via the vehicle controller 70. The parking control apparatus 100 is not limited to a type of performing all the operations for the driving control of the vehicle in an automated (autonomous) manner and may also be of a semiautomated (semiautonomous) type in which the steering operation is performed in an automated (autonomous) manner while the driver performs the accelerator/brake operation. In the latter case, for example, the driver gets on the vehicle and performs the accelerator/brake operation, and a passenger of the vehicle other than the driver or a worker of the parking facility operates the operation terminal 5.

Then, the control device 10 detects spaces into which parking is possible (referred to as available parking spaces, hereinafter) from among the detected parking frames. For example, on the basis of the ranging information (reflection point information) from the ranging devices 2, the control device 10 determines whether or not an obstacle is present in the detected parking frames or the routes when parking into the parking frames. Then, the control device 10 detects parking frames with no obstacle as the available parking spaces. The present invention is not limited to detecting the available parking spaces on the basis of the ranging information from the ranging devices 2, and the available parking spaces may also be detected, for example, from images captured by the set of cameras 1 or a camera installed in the parking lot. Additionally or alternatively, information on the available parking spaces may be acquired, for example, from the parking lot information 134 by accessing the information server 3.

Then, the control device 10 detects a parking space recommended for the driver and passengers of the subject vehicle (referred to as a recommended parking space, hereinafter) from among the available parking spaces and presents the recommended parking space to the driver and passengers of the subject vehicle. For example, the control device 10 transmits information on the recommended parking space to the operation terminal 5 and controls the display 53 of the operation terminal 5 to display the information on the recommended parking space. Additionally or alternatively, the control device 10 controls the display 31 of the output device 30 to display information on the recommended parking space. When there are two or more available parking spaces as the above, the control device 10 determines an available parking space to which the required time when parking into the available parking space is the shortest, for example, as the recommended parking space. Additionally or alternatively, for example, the control device 10 determines an available parking space closest to the gaze point of the driver of the subject vehicle as the recommended parking space.

Then, the control device 10 receives the designation of a target parking frame made by the driver or a passenger of the subject vehicle and sets a target parking position at which the vehicle is parked. The driver or passenger of the subject vehicle can designate the target parking frame, such as by touching an icon of the recommended parking space displayed on the touch panel-type display 53 of the operation terminal 5 or moving a cursor on the display to the icon of the recommended space with a cursor operation key displayed on the display 53 and operating an enter button. The designation of the target parking frame is not limited to being designated by a person, and the parking facility side may automatically designate the target parking frame. For example, the display 53 of the operation terminal 5 may be configured to display one recommended parking space that is designated on the parking facility side, and the driver or passenger of the subject vehicle may designate the recommended parking space. The control device 10 executes such a process to set the target parking position as a position at which the vehicle is parked.

The parking start position setting process will then be described. To calculate a parking route, which will be described later, the control device 10 sets a position at which parking control is started (referred to as a parking start position, hereinafter). For example, when the user operates a start switch provided on the operation terminal 5 for starting the parking control, the current position of the vehicle at that time is set as the parking start position. The method of specifying the current position is not particularly limited. For example, the control device 10 may access the information server 3 via antennas 211 to calculate the current position from the map information 133 or may use the global positioning system (GPS) to measure the current position of the vehicle.

The current position estimation process will then be described. To move the vehicle along the parking route or rescue route, which will be described later, the control device 10 estimates the current position of the vehicle. For example, the control device 10 measures the current position of the vehicle using the GPS, acquires the current position through the road-to-vehicle communication, or calculates the current position on the basis of the steering amount of the steering and the accelerator operation amount.

The operator position detection process will then be described with reference to FIG. 2A to FIG. 2D. The control device 10 detects the position of the operator carrying the operation terminal 5. The position of the operator is used for generation of the parking route or rescue route. The position of the operator includes information on the position on the movement plane of the vehicle and information on the height position. For example, the control device 10 detects the position of the operation terminal 5 carried by the operator and calculates the position of the operator on the basis of the position of the operation terminal 5. The operation terminal 5 may be provided at a predetermined position or may also be carried by the operator. When the operation terminal 5 is provided at a predetermined position, the operator moves to the position at which the operation terminal 5 is provided, and uses the operation terminal 5 at that position. In these cases, the control device 10 can determines the position of the operation terminal 5 as the position of the operator.

Figure 2A:
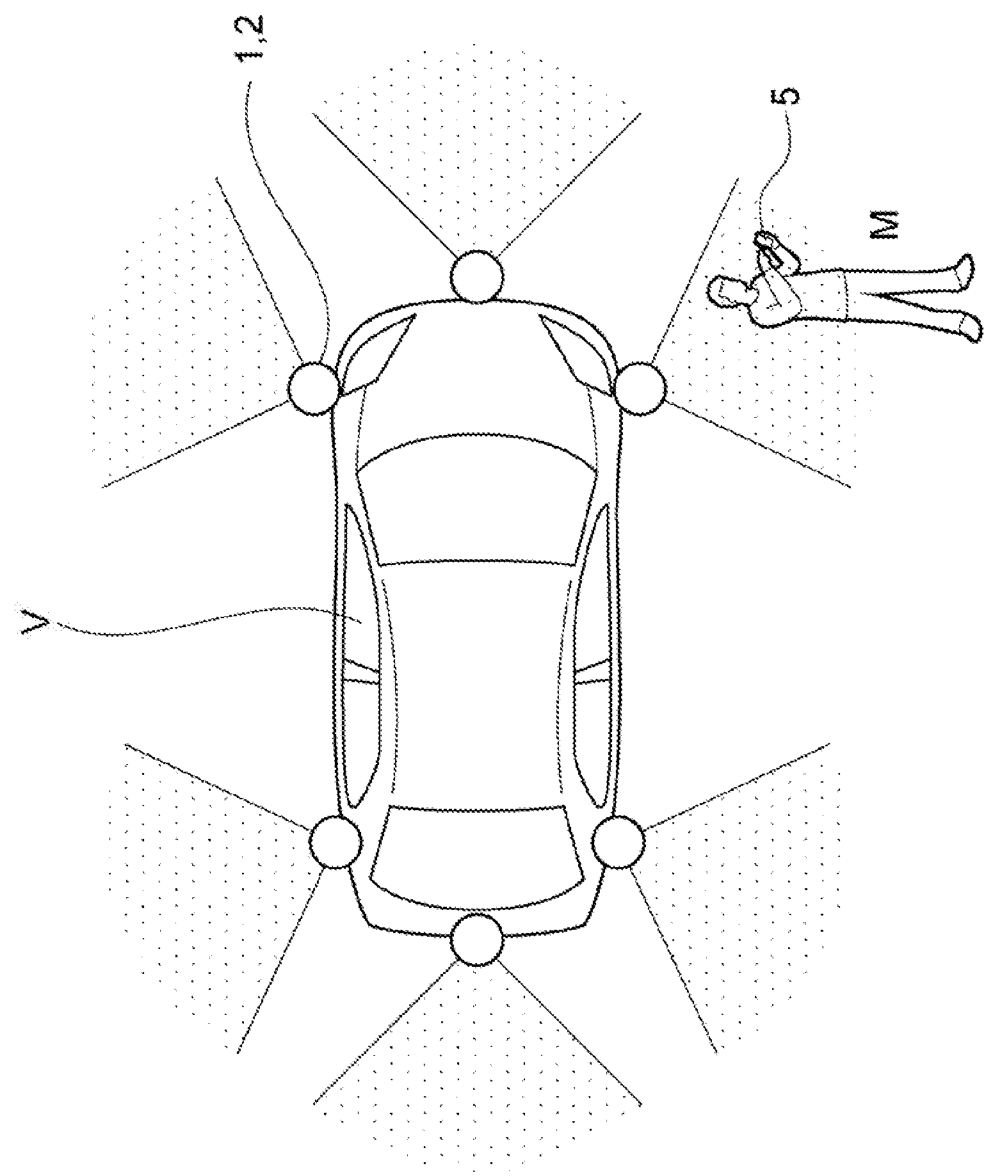
FIG. 2A is a diagram for describing a first detection scheme as an example of a detection method for the position of an operator.

FIG. 2A is a diagram to describe detecting the position of an operator M on the basis of the detection results from the multiple ranging devices 2 provided in a vehicle V and/or the images captured by the set of cameras 1. The control device 10 detects the position of the operator M on the basis of the images captured by the cameras 1*a* to 1*d*. Additionally or alternatively, the control device 10 detects the two-dimensional position and/or three-dimensional position of the operator M on the basis of the detection results from the ranging devices 2.

Figure 2B:
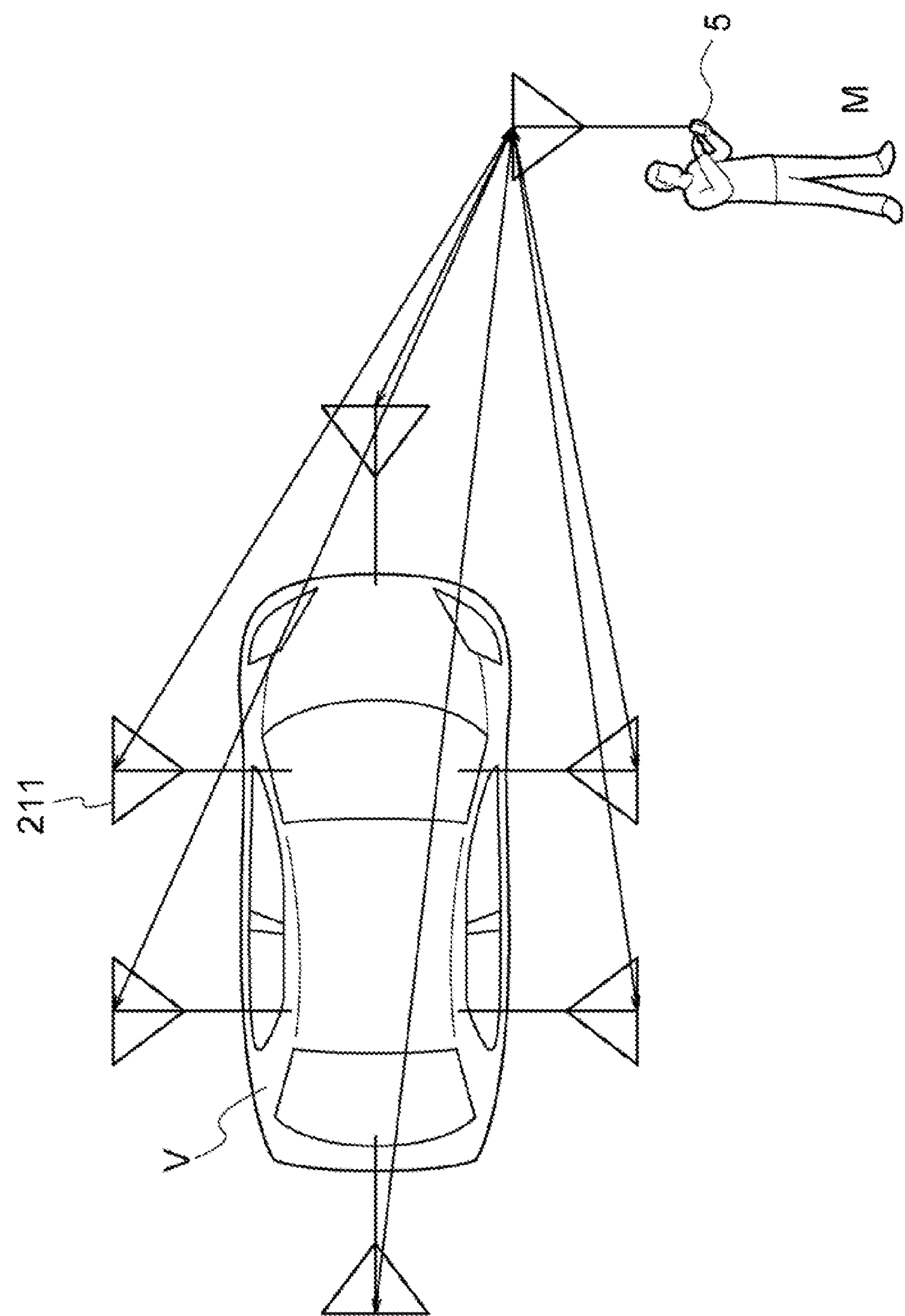
FIG. 2B is a diagram for describing a second detection scheme as an example of a detection method for the position of an operator.

FIG. 2B is a diagram to describe detecting the position of the operation terminal 5 or the position of the operator M carrying the operation terminal 5 on the basis of the communication radio waves between the multiple antennas 211 provided at different positions of the vehicle V and the operation terminal 5. When the multiple antennas 211 communicate with one operation terminal 5, the intensity of the received radio wave of each antenna 211 is different. The control device 10 calculates the position of the operation terminal 5 on the basis of the intensity difference between the received radio waves of the antennas 211. Additionally or alternatively, the control device 10 calculates the two-dimensional position and/or three-dimensional position of the operation terminal 5 or the operator M from the intensity difference between the received radio waves of the antennas 211.

Figure 2C:
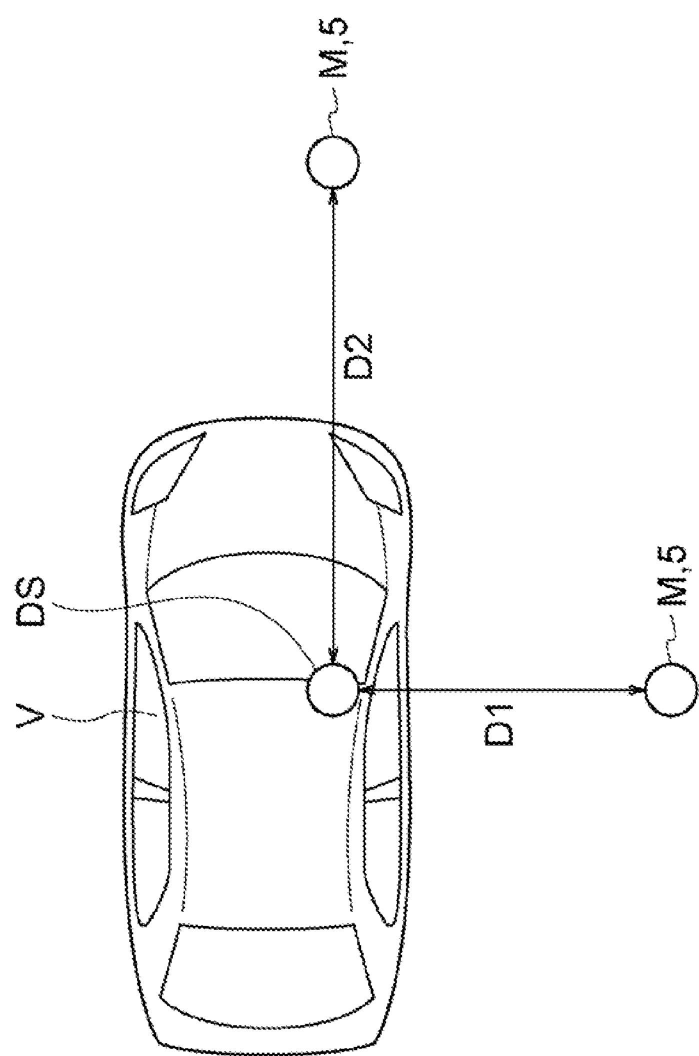
FIG. 2C is a diagram for describing a third detection scheme as an example of a detection method for the position of an operator.

FIG. 2C is a diagram to describe preliminarily designating a predetermined position (direction/distance: D1, D2) with respect to the driver seat DS of the vehicle as the operating position of the operator M or as the position at which the operation terminal 5 is installed. For example, when the operator M temporarily stops the vehicle V at a designated position and gets off the vehicle V to operate the operation terminal 5 provided at the predetermined position, the control device 10 calculates the initial position of the operator M with respect to the vehicle V or the initial position of the terminal 5, which is carried by the operator M, with respect to the vehicle V.

Figure 2D:
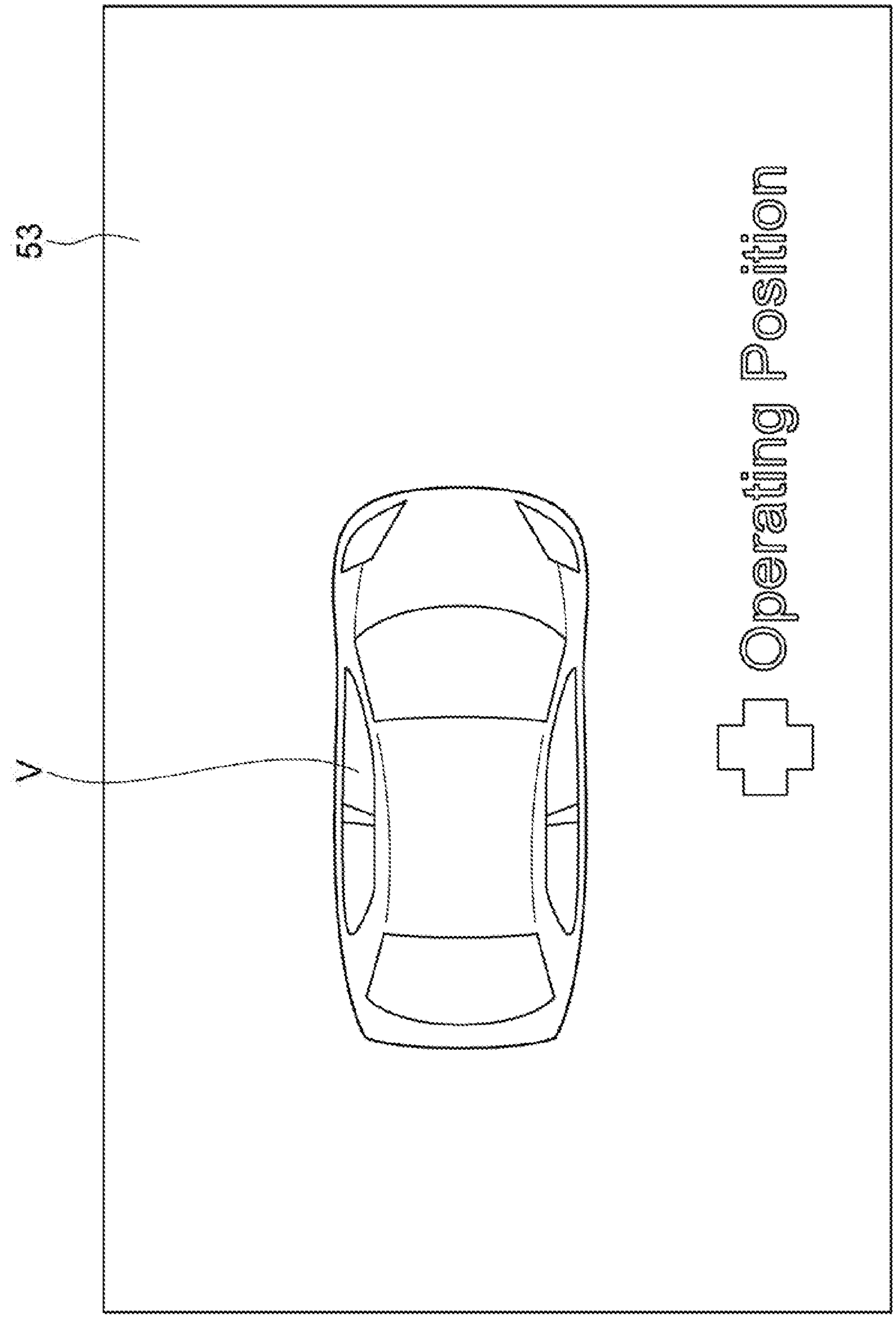
FIG. 2D is a diagram for describing a fourth detection scheme as an example of a detection method for the position of an operator.

FIG. 2D is a diagram to describe displaying image information representing the calculated operating position (a position at which the operator M stands: operation position) on the display 53 of the operation terminal 5. When detecting the position of the operator, the control device 10 controls the display 53 of the operation terminal 5 to display the image as illustrated in FIG. 2D. This display control may be executed by an application installed on the operation terminal 5 side or may also be executed based on a command from the control device 10.

The parking route generation process will then be described. The control device 10 generates a route from the parking start position to the target parking position (referred to as a parking route, hereinafter) as a route for parking the vehicle into the target parking frame. The shape of the parking route is not particularly limited, and the parking route may be a straight route, a curved route, or a route of the combination thereof. When the vehicle turns for parking before reaching the target parking position, the parking route includes a route from the parking start position to the position of turn for parking and a route from the position of turn for parking to the target parking position. For example, the control device 10 calculates as the parking route a route obtained by combining a curved route from the parking start position to the position of turn for parking and a straight route from the position of turn for parking to the target parking position. The present invention is not limited to calculating the parking route, and the parking route determined for each parking frame may be preliminarily stored in a memory (e.g., the ROM 12), for example, and the control device 10 may read the parking route from the memory. Additionally or alternatively, for example, the control device 10 may acquire information on a predetermined parking route through road-to-vehicle communication or vehicle-to-vehicle communication to generate the parking route. Additionally or alternatively, the parking route can be generated through setting a halfway position between the parking start position and the target parking position, generating a parking route from the parking start position to the halfway position, and generating a parking route from the halfway position to the target parking position when approaching the halfway position. Additionally or alternatively, when the surrounding situation changes or when the position of the vehicle deviates from the parking route, the parking route can be generated again and changed during the control.

The function of executing the rescue mode will then be described. The obstacle detection process will be described with reference to FIGS. 3A and 3B. The control device 10 detects obstacles existing outside the vehicle. The obstacles include structures such as walls and pillars of a parking lot, installation objects around the vehicle, pedestrians, other vehicles, parked vehicles, and other similar objects.

Figure 3A:
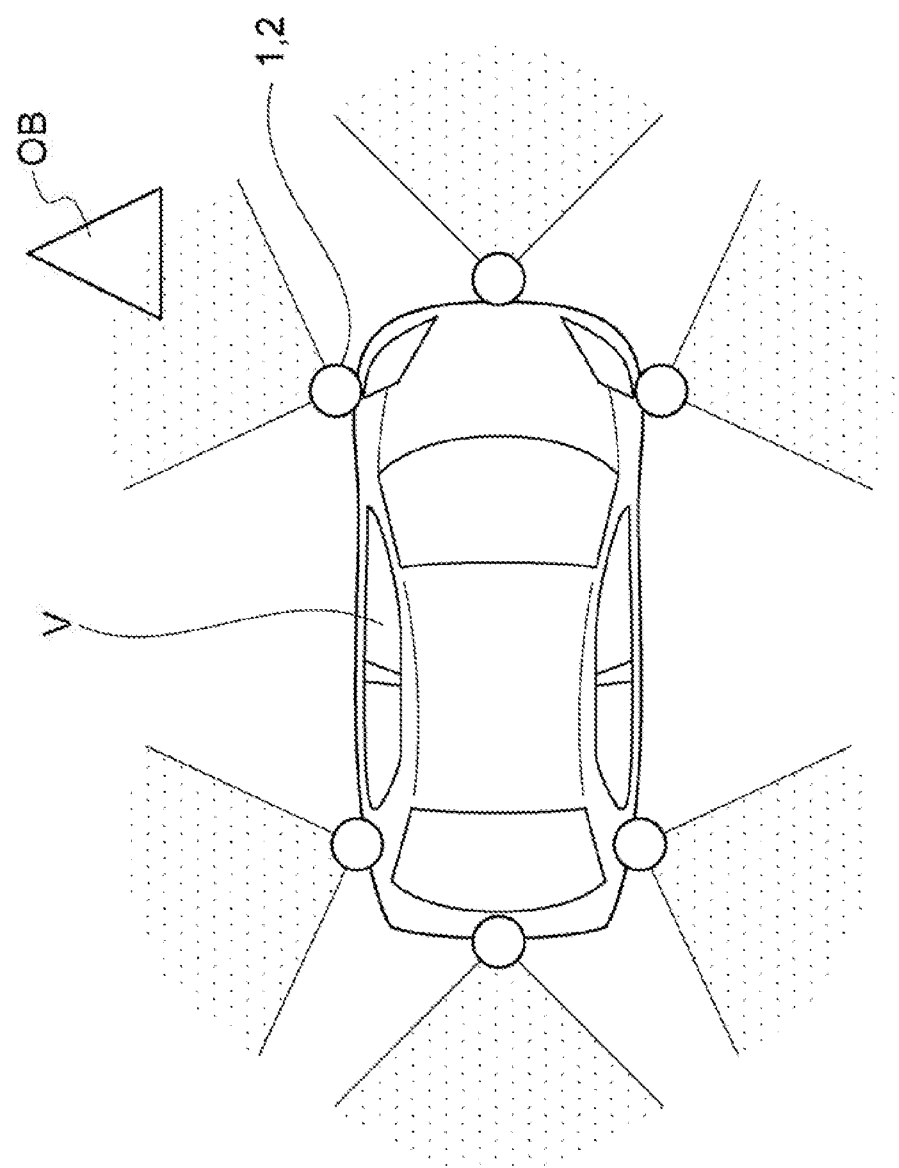
FIG. 3A is a diagram for describing a first detection scheme as an example of a detection method for an obstacle.

FIG. 3A is a diagram to describe detecting an obstacle OB existing around the vehicle V. As illustrated in FIG. 3A, the control device 10 detects the obstacle OB on the basis of the detection results from the multiple ranging devices 2 provided in the vehicle and/or the images captured by the set of cameras 1. The detection results from the ranging devices 2 include the presence or absence of the obstacle OB, the position of the obstacle OB, the size of the obstacle OB, and the distance to the obstacle OB. Additionally or alternatively, the control device 10 performs image processing on the images captured by the cameras 1*a* to 1*d* thereby to detect the presence or absence of the obstacle OB, the position of the obstacle OB, the size of the obstacle OB, and the distance to the obstacle OB. The detection of an obstacle is not limited to using the above-described method and may be performed, for example, using a motion stereo technique with the cameras 1*a* to 1*d*.

Figure 3B:
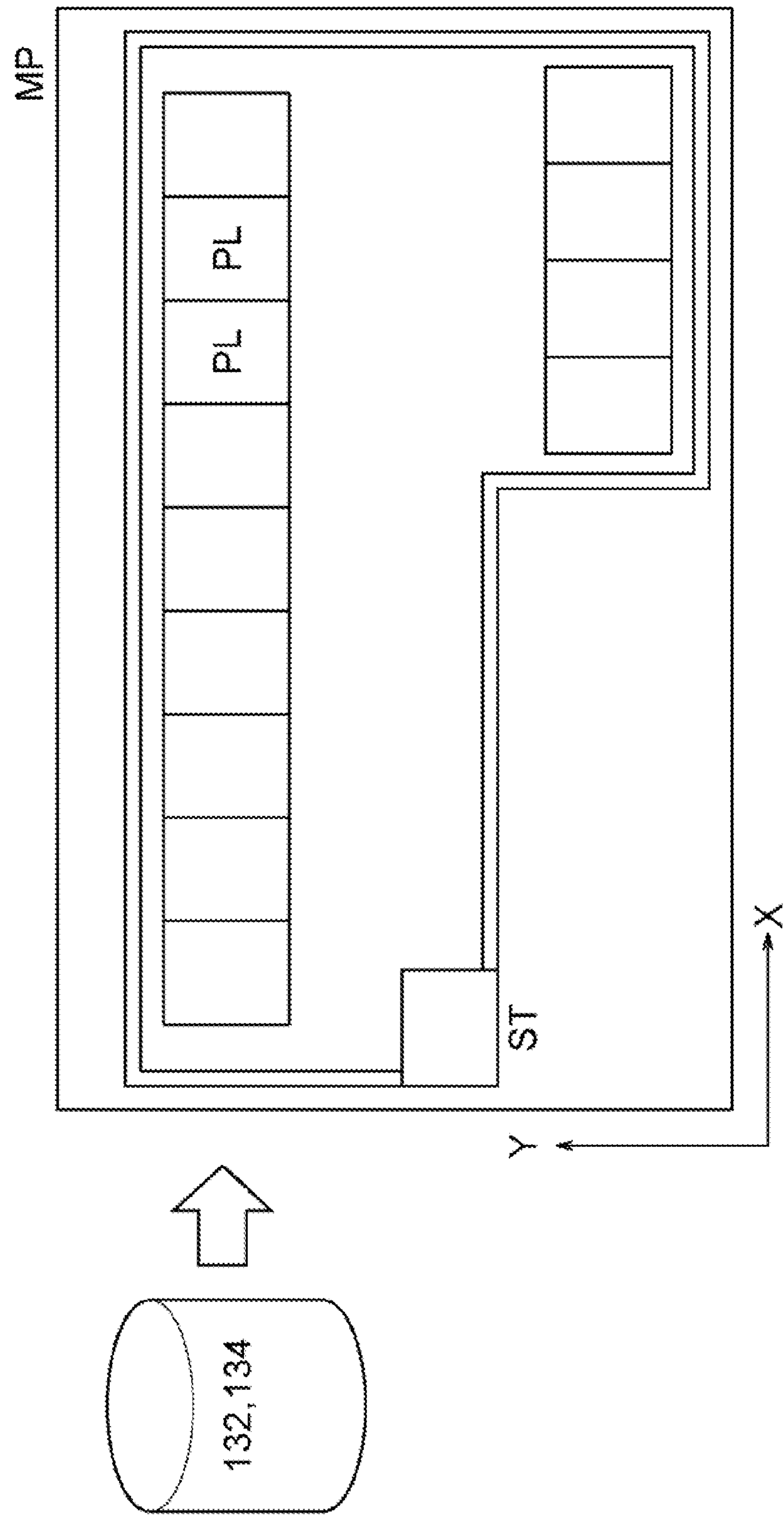
FIG. 3B is a diagram for describing a second detection scheme as an example of a detection method for an obstacle.

FIG. 3B is a diagram for describing a method of detecting obstacles including structures such as walls and pillars of a parking lot. As illustrated in FIG. 3B, the control device 10 accesses the storage device 132 of the information server 3 to acquire the parking lot information 134. The parking lot information 134 includes information on structures such as walls and pillars of a parking lot, and the control device 10 therefore detects obstacles including structures on the basis of the parking lot information 134. In FIG. 3B, a specific floor map MP of an hourly parking lot ST is illustrated as the parking lot information 134 and, in the floor map MP, the position of each parking lot PL is represented, for example, by an X coordinate and a Y coordinate.

In one or more embodiments of the present invention, the detection result by the obstacle detection process is used as a trigger for transition from the parking control to the rescue mode, but the present invention is not limited to this. The control device 10 can continuously acquire the detection result of an obstacle and use the detection result for other processes. For example, the control device 10 may use the detection result of an obstacle in the course of setting the target parking position, may use the detection result of an obstacle in the course of calculating the parking route, may use the detection result of an obstacle in the course of setting the next parking target position and next parking direction, which will be described later, or may use the detection result of an obstacle in the course of generating the rescue route, which will be described later.

The deceleration process will then be described. When detecting an obstacle while the vehicle is moving along the parking route toward the target parking position, the control device 10 forcibly decelerates the vehicle to make a stop in order to prevent the vehicle from contacting the obstacle. For example, even when the target speed moderately decreases as the vehicle approaches the target parking position in the parking control, the control device 10 increases the rate of deceleration and forcibly controls the vehicle to make a stop. Also when the parking route includes a position of turn for parking and an obstacle is detected while the vehicle is moving toward the position of turn for parking, the control device 10 controls the vehicle to make a stop.

The next parking direction calculation process will then be described. When the parking control to the target parking position is suspended due to detection of an obstacle, the control device 10 specifies a parking direction when the vehicle is parked at the next target parking position. First, the control device 10 sets the next target parking position. The next target parking position may be a target parking position of an available parking space that is already detected as one of the available parking spaces by the target parking frame setting process or may also be a different target parking position that is arbitrarily designated by the operator. For example, the display 53 of the operation terminal 5 may be configured to display the surrounding image, and the driver or a passenger of the subject vehicle may designate the target parking position at an arbitrary position.

For example, the control device 10 sets the next target parking position with reference to the execution result of the target parking frame setting process. When two or more available parking spaces are detected in the course of the target parking frame setting process, the control device 10 selects the next available parking space from among the available parking spaces which have not been selected as the recommended parking space. Then, the control device 10 sets the next target parking position on the basis of the next available parking space. When there are two or more available parking spaces as the above, the control device 10 sets the closest available parking space from the current position of the stopped vehicle, for example, as the next available parking space. Additionally or alternatively, for example, the controller 10 takes into account not only the current position but also the direction of the vehicle to set an available parking space with the shortest required time when parking as the next available parking space. The next available parking space is set based on such a criterion thereby to prevent the available parking space from being set at a corner of a parking lot, which is said to be relatively difficult to park, or at a position to which the vehicle cannot be parked from the current position.

Then, the control device 10 calculates the next parking direction for the vehicle on the basis of the set next target parking position. The control device 10 specifies the next parking direction on the basis of the target parking position, the next target parking position, the current position of the vehicle, and the direction of the vehicle.

For example, the control device 10 specifies the next parking direction on the basis of the parking route to the next target parking position. The control device 10 generates a parking route to the set next target parking position (referred to as a next parking route, hereinafter) and specifies a direction along the next parking route as the next parking direction. When the next parking route includes a position of turn for parking, the control device 10 specifies as the next parking direction a direction from the position of turn for parking to the next target parking position in the next parking route. The next parking direction includes a forward direction and a backward direction that are traveling directions on the next parking route.

Additionally or alternatively, for example, the control device 10 specifies the next parking direction on the basis of the relationship between the target parking position and the next target parking position. When the next target parking position is located on the opposite side to the target parking position across a passage, the control device 10 takes into account the direction of the vehicle and specifies the next target parking direction from the direction toward the next target parking position from the target parking position. For example, when the vehicle makes a stop in the forward direction with respect to the next target parking position, the control device 10 determines that it is easy to park forward at the next target parking position and specifies the forward direction in a direction along the next parking route as the next parking direction. In the above case, when the vehicle makes a stop in the backward direction with respect to the next target parking position, the control device 10 determines that it is easy to park backward at the next target parking position and specifies the backward direction in a direction along the next parking route as the next parking direction.

Additionally or alternatively, for example, the control device 10 takes into account the shape of the parking frame corresponding to the target parking position and the shape of the parking frame corresponding to the next target parking position and/or the relationship of the arrangement with other parking frames and thereby specifies the parking direction with a high degree of accuracy. For example, it is assumed that all the parking frames have a rectangular shape. It is also assumed that the target parking position is in one parking lot of a plurality of parking lots in which the parking lots are arranged such that the long side of a parking frame is adjacent to the long side of another parking frame while the next target parking position is in one parking lot of a plurality of parking lots in which the parking lots are arranged such that the short side of a parking frame is adjacent to the short side of another parking frame. In this case, on the basis of the relationship between the target parking position and the other parking lots on both sides of the target parking position, the control device 10 determines that the vehicle has to be parked in the forward direction or backward direction at the target parking position while the vehicle has to be parked in a parallel parking manner at the next parking position. Then, the control device 10 specifies the direction along the next parking route for parallel parking as the next parking direction.

The rescue route generation process will then be described. The rescue route refers to a route for the vehicle to leave the target parking position upon transition to the rescue mode. On the basis of the next parking direction, the control device 10 generates an evacuation route (referred to as a rescue route, hereinafter) as a route for the vehicle to move from the position at which the vehicle makes a stop to the target position (referred to as a rescue position, hereinafter) to which the vehicle moves. For example, when the next parking direction is the forward direction, first, the control device 10 sets the rescue position at a position from which the vehicle can be parked at the next target parking position in the forward direction. Then, the control device 10 generates a route connecting the current position and the rescue position such that the vehicle can safely move to the rescue position. The shape of the rescue route is not particularly limited, and the rescue route may be a straight route, a curved route, or a route of the combination thereof. The control device 10 takes into account the detection result of an obstacle and the positional information of the operator to generate the rescue route which allows the vehicle to safely move to the rescue position.

Additionally or alternatively, in one or more embodiments of the present invention, the control device 10 sets as the rescue position a position from which the parking control to the next target parking position is possible. For example, the control device 10 generates the next parking route to the set next target parking position and sets the rescue position on the next parking route. Through this operation, the position for the vehicle to leave the target parking position is not simply a position separated from the target position but a position from which the parking control to the next target parking position can be started. As a result, the next parking control can be performed smoothly.

The route following process and the target speed generation process, which are processes for moving the vehicle along the parking route or the rescue route, will then be described. After generating the parking route or the rescue route, the control device 10 calculates a target steering angle and a target speed in order to move the vehicle along any of these routes. The control device 10 outputs the calculated target steering angle and target speed to the vehicle controller 70. When an obstacle is detected during execution of the parking control, the control device 10 forcibly reduces the target speed by the deceleration process. Methods of calculating the target steering angle and the target speed are not particularly limited, and schemes known at the time of filing the present application can be appropriately applied.

Figure 4A:
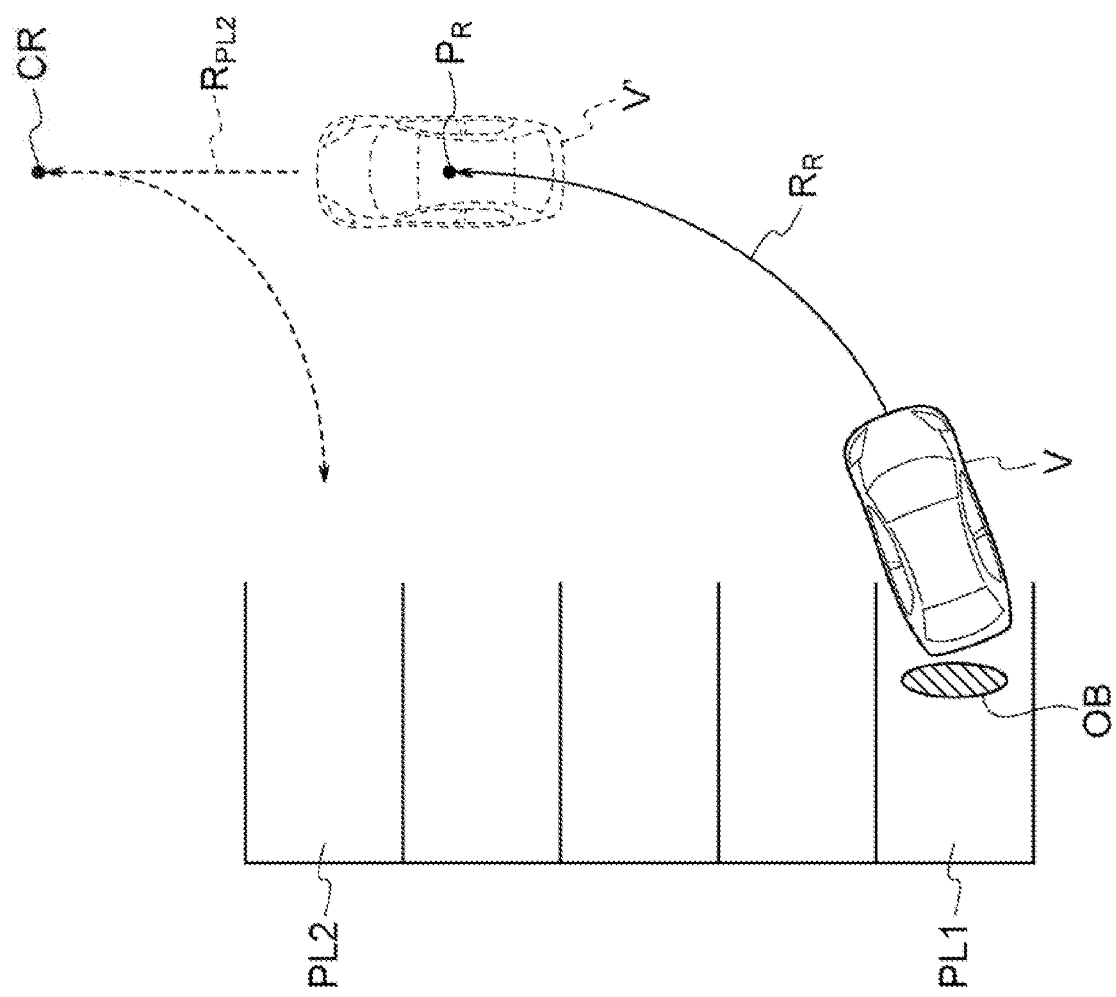
FIG. 4A is a diagram for describing the operation in a first rescue mode as an example of the operation in a rescue mode according to one or more embodiments of the present invention.
Figure 4B:
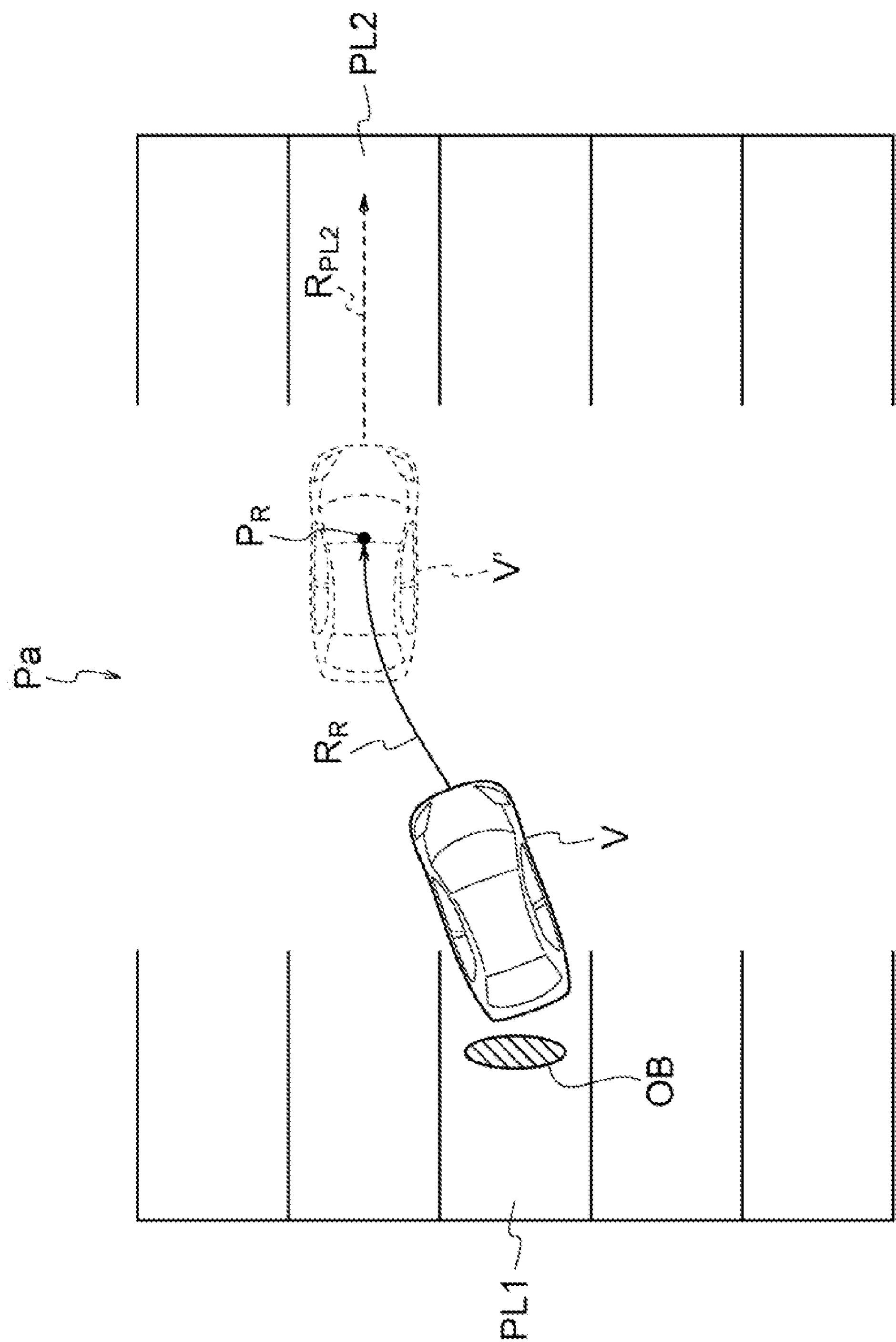
FIG. 4B is a diagram for describing the operation in a second rescue mode as an example of the operation in a rescue mode according to one or more embodiments of the present invention.
Figure 4C:
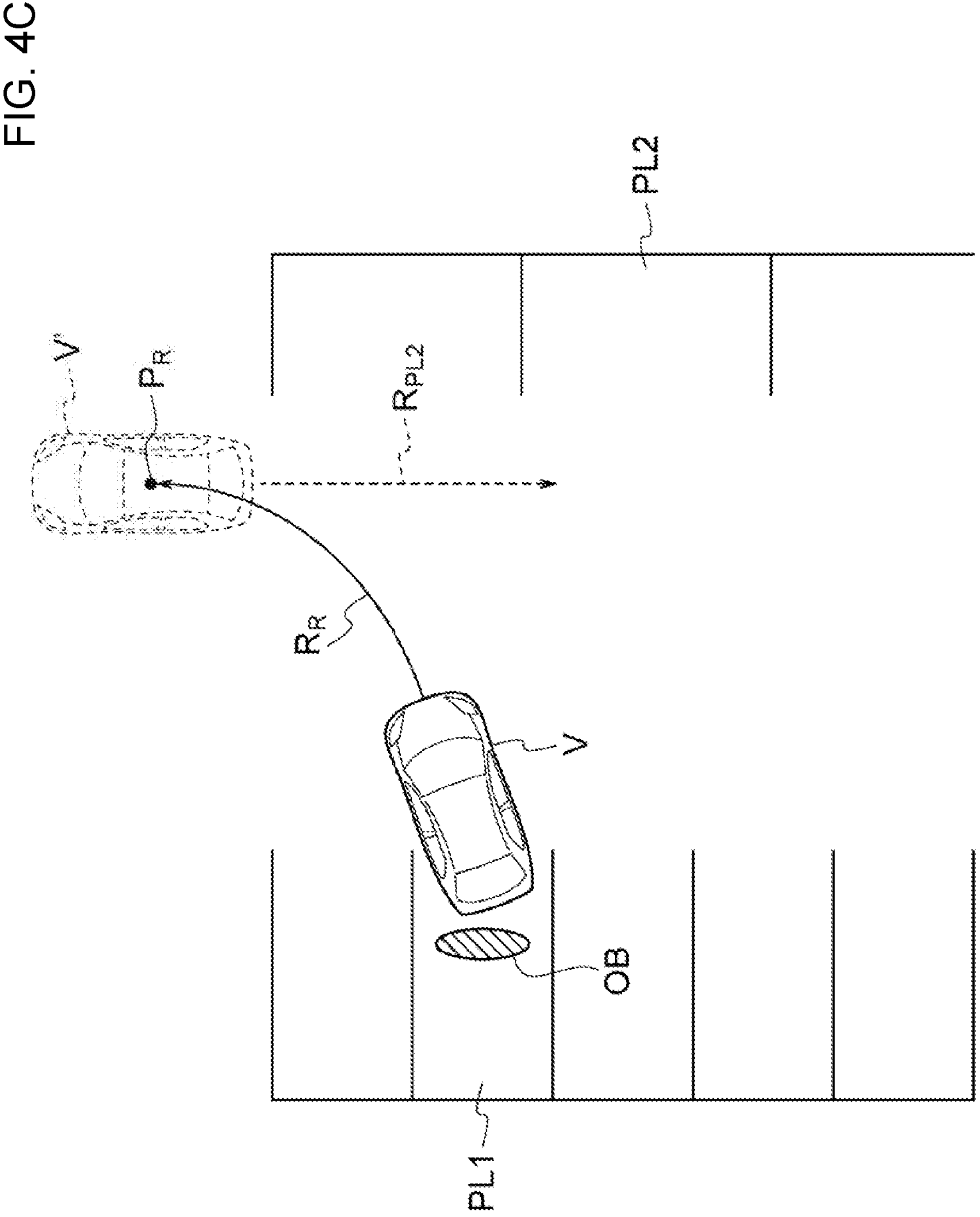
FIG. 4C is a diagram for describing the operation in a third rescue mode as an example of the operation in a rescue mode according to one or more embodiments of the present invention.

Examples of the operation in the rescue mode according to one or more embodiments of the present invention will then be described with reference to FIGS. 4A to 4C. FIGS. 4A to 4C are diagrams each illustrating an example of the operation in the rescue mode. FIGS. 4A to 4C illustrate scenes in which an obstacle OB is detected while the parking control apparatus 100 is executing the parking control for parking the vehicle V backward into a parking lot PL1. In these scenes, the control device 10 determines that the vehicle V cannot be parked into the parking lot PL1 and controls the display 53 of the operation terminal 5 to present information that enables the transition to the rescue mode in order to allow the operator of the operation terminal 5 to select whether or not to transition to the rescue mode. It is assumed that the operator selects the rescue mode and presses the enter button of the operation terminal 5.

In FIGS. 4A to 4C, the parking lot PL1 represents the target parking position while a parking lot PL2 represents the next target parking position. Examples of the method of specifying the next target parking position includes a method similar to that when setting the target parking position. Specifically, first, the control device 10 detects available parking spaces from the images captured by the set of cameras 1 or a camera installed at the parking lot or accesses the information server 3 to acquire the information on available parking spaces from the parking lot information 134. Then, the control device 10 detects a recommended parking space from among the available parking spaces and transmits information on the recommended parking space to the operation terminal 5, which displays on its display 53 the information on the recommended parking space. The operator touches the icon of the recommended parking space displayed on the touch panel-type display 53 of the operation terminal 5 thereby to specify the target parking frame. This allows the control device 10 to specify the next target parking position.

The timing of specifying the next target parking position is not limited to being after the transition to the rescue mode, and may also be before the transition to the rescue mode. For example, when two or more available parking spaces are detected in the course of setting the target parking position, the control device 10 may prioritize the available parking spaces in accordance with a predetermined rule and preliminarily specify as the next target parking position a higher-priority one from among available parking spaces that are not selected as the target parking position.

In the example of FIG. 4A, the parking lot PL2 is arranged in parallel with the parking lot PL1, and parking lots for three vehicles exist between the parking lot PL1 and the parking lot PL2. After transition to the rescue mode, first, the control device 10 specifies the parking lot PL2, which is an available parking space, as the next target parking position on the basis of a command from the operator and generates a parking route corresponding to the parking lot PL2 as a next parking route $R_{PL2}$. Then, when detecting that the next parking route $R_{PL2}$ includes a position of turn for parking CR, the control device 10 specifies as the next parking direction a direction along the route from the position of turn for parking CR to the parking lot PL2 in the next parking route $R_{PL2}$ and specifies that the next parking direction is the backward direction. The control device 10 sets the parking start position, which is the start point of the next parking route $R_{PL2}$, as a rescue position $P_R$ and generates a rescue route $R_R$ from the current position of the vehicle V to the rescue position $P_R$. In the example of FIG. 4A, the rescue route $R_R$ is indicated by a curved route for the vehicle V to move to the left side while moving forward. The control device 10 calculates a target steering angle and a target speed for moving the vehicle V to the rescue position $P_R$ along the rescue route $R_R$ and outputs the calculated target steering angle and target speed to the vehicle controller 70. The vehicle V can move to the rescue position $P_R$ thereby to evacuate from the obstacle OB and the parking lot PL1. In the example of FIG. 4A, the state of the vehicle V after moving to the rescue position $P_R$ is indicated as a vehicle V'.

The vehicle V is moved by the vehicle controller 70 to a position separated from the obstacle OB and the parking lot PL1. This position is the start point of the parking route to the parking lot PL2. Through this operation, the operator of the operation terminal 5 can achieve execution of the parking control to the parking lot PL2 and park the vehicle V' smoothly backward into the parking lot PL2 along the next parking route $R_{PL2}$. The parking control to the parking lot PL2 is not limited to the remote control by the operation terminal 5. For example, the driver may get on the vehicle V' and park the vehicle V' backward into the parking lot PL2 along the next parking route $R_{PL2}$.

In the example of FIG. 4B, the parking lot PL2 faces the parking lot PL1 across a passage $P_a$ and is located diagonally opposite the parking lot PL1. After transition to the rescue mode, the control device 10 specifies the parking lot PL2, which is an available parking space, as the next target parking position on the basis of a command from the operator. Then, the control device 10 specifies a direction $R_{PL2}$ along the parking route toward the parking lot PL2 as the next parking direction because the parking lot PL2 is located diagonally opposite the parking lot PL1. The front part of the stopped vehicle V faces the parking lot PL2 and the control device 10 therefore specifies that the next parking direction is the forward direction in a direction along the parking route. The control device 10 sets the position from which the vehicle can be parked forward into the parking lot PL2 as a rescue position $P_R$ and generates a rescue route $R_R$ from the current position of the vehicle V to the rescue position $P_R$. In the example of FIG. 4B, the rescue route $R_R$ is indicated by a curved route for the vehicle V to move to the left side while moving forward. The vehicle controller 70 executes the driving control to move the vehicle V to the rescue position $P_R$, and the vehicle V can thereby evacuate from the obstacle OB and the parking lot PL1. In the example of FIG. 4B, the state of the vehicle V after moving to the rescue position $P_R$ is indicated as a vehicle V'.

The vehicle V is moved by the vehicle controller 70 to a position separated from the obstacle OB and the parking lot PL1. This position is a position facing the front of the parking lot PL2. Through this operation, the operator of the operation terminal 5 can achieve execution of the parking control to the parking lot PL2 and move and park the vehicle V' smoothly forward into the parking lot PL2. The parking control to the parking lot PL2 is not limited to the remote control by the operation terminal 5. For example, the driver may get on the vehicle V' and move and park the vehicle V' forward into the parking lot PL2. The rescue position $P_R$ can be set at a position close to the parking lot PL1. For example, the rescue position $P_R$ may be set in accordance with a position at which the driver can easily get on the vehicle.

In the example of FIG. 4C, the parking lot PL1 is arranged in parallel with other parking lots whereas the parking lot PL2 is arranged in a parallel parking manner with other parking lots. After transition to the rescue mode, first, the control device 10 specifies the parking lot PL2, which is an available parking space, as the next target parking position on the basis of a command from the operator. Then, the control device 10 generates a parking route $R_{PL2}$ for parallel parking into the parking lot PL2 from the arrangement relationship between the parking lot PL2 and the parking lots on both sides and specifies the backward direction in a direction along the parking route for parallel parking as the next parking direction. The control device 10 sets the position from which the vehicle can be parked in a parallel parking manner into the parking lot PL2 as a rescue position $P_R$ and generates a rescue route $R_R$ from the current position of the vehicle V to the rescue position $P_R$. In the example of FIG. 4C, the rescue route $R_R$ is indicated by a curved route for the vehicle V to move to the left side while moving forward. The vehicle controller 70 executes the driving control to move the vehicle V to the rescue position $P_R$, and the vehicle V can thereby evacuate from the obstacle OB and the parking lot PL1. In the example of FIG. 4C, the state of the vehicle V after moving to the rescue position $P_R$ is indicated as a vehicle V'.

The vehicle V is moved by the vehicle controller 70 to a position separated from the obstacle OB and the parking lot PL1. This position is a position which is on a line approximately parallel to the parking direction into the parking lot PL2 and from which backward movement is possible. Through this operation, the operator of the operation terminal 5 can achieve execution of the parking control to the parking lot PL2 and move and park the vehicle V' smoothly backward into the parking lot PL2 in a parallel parking manner. The parking control to the parking lot PL2 is not limited to the remote control by the operation terminal 5. For example, the driver may get on the vehicle V' and move and park the vehicle V' backward into the parking lot PL2 in a parallel parking manner.

Figure 5:
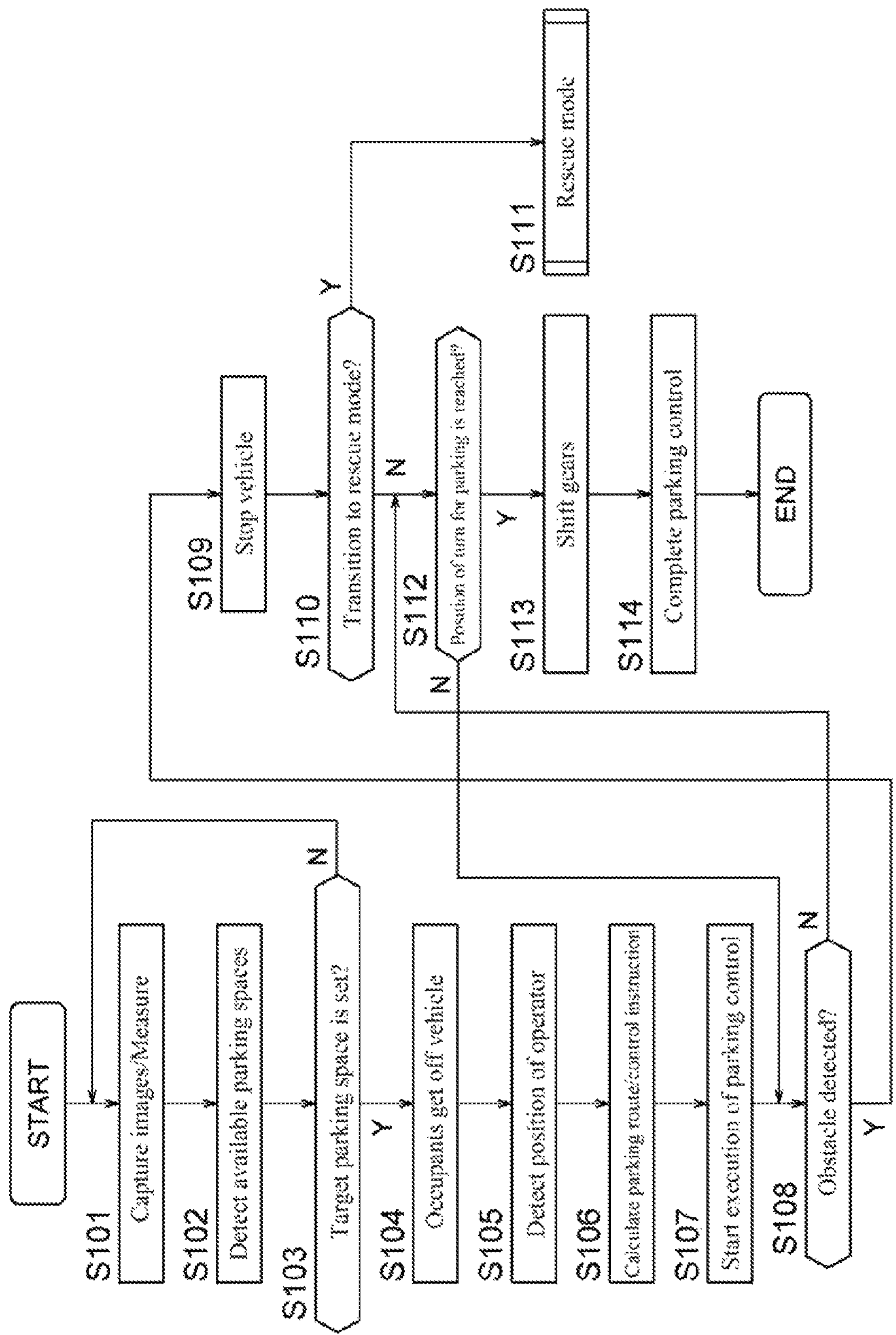
FIG. 5 is a flowchart illustrating an example of a control procedure executed by the parking control system according to one or more embodiments of the present invention.

The control procedure of the parking control will be described below with reference to a flowchart illustrated in FIG. 5. FIG. 5 is a flowchart illustrating the control procedure of a parking control process executed by the parking control system 1000 according to one or more embodiments of the present invention. The start trigger for the parking control process is not particularly limited, and the parking control process may be triggered by operating a start switch of the parking control apparatus 100.

In step S101, the control device 10 of the parking control apparatus 100 acquires information around the vehicle. The control device 10 acquires, as needed, the ranging signals from the ranging devices 2 attached to multiple sites of the vehicle. Additionally or alternatively, the control device 10 acquires, as needed, images captured by the cameras 1$a$ to 1$d$ attached to multiple sites of the vehicle. Acquisition of the ranging signals from the ranging devices 2 and acquisition of the captured images from the set of cameras 1 may be selectively performed.

In step S102, the control device 10 detects available parking spaces. The control device 10 detects frames (areas) of parking spaces on the basis of the images captured by the cameras 1$a$ to 1$d$. The control device 10 detects empty parking spaces using the detection data from the ranging devices 2 and/or the detection data extracted from the captured images. The control device 10 detects available parking spaces from among the parking spaces. The available parking spaces are parking spaces which are empty (i.e., other vehicles are not parked) and to which routes for completing the parking can be calculated. In one or more embodiments of the present invention, the condition that a parking route can be calculated means that a trajectory of the route from the current position to a target parking position can be rendered on the road surface coordinates without interfering with obstacles (including parked vehicles).

In step 103, the control device 10 transmits the available parking spaces to the operation terminal 5, controls the display 53 of the operation terminal 5 to display the available parking spaces, and requests the operator to input selection information of the target parking position for parking the vehicle. The target parking position may be automatically selected by the control device 10 or the parking facility side. When the operation command of specifying an available parking space is input to the operation terminal 5, the available parking space is set as the target parking position.

In one or more embodiments of the present invention, the operator performs a so-called remote parking process in which the operator gets off the vehicle and parks the vehicle from outside. In step S104, the operator of the operation terminal 5 and other occupants of the vehicle get off the vehicle. The operator who gets off the vehicle inputs operation information regarding the parking process to the operation terminal 5. The operation information includes at least a start instruction for the parking process. The operation information is transmitted to the control device 10.

In step S105, the control device 10 detects the position of the operator. The control device 10 detects the position of the operator, for example, by any of the methods described with reference to FIGS. 2A to 2C. For example, when detecting the operator from the captured images from the set of cameras 1 or the detection data from the ranging devices 2, the control device 10 detects the relative position of the operator with respect to the vehicle.

In step S106, the control device 10 calculates the parking route to the target parking position. The parking route includes a position of turn for parking required to move to the available parking space. For this calculation, the parking route is defined as a line and is also defined as a strip-shaped area corresponding to the occupied area by the vehicle based on the vehicle width. The occupied area by the vehicle is defined with consideration for the vehicle width and a margin width ensured for movement. The control device 10 generates a control instruction for moving the vehicle along the calculated parking route. The control device 10 controls the display 53 of the operation terminal 5 to display the parking route and encourages the operator to confirm it.

In step S107, the control device 10 starts execution of the parking control when the operator confirms the parking route and inputs the execution instruction to the operation terminal 5. This allows the vehicle to start moving along the parking route toward the target parking position.

In step S108, the control device 10 determines whether or not an obstacle is detected on or near the parking route. The control device 10 continuously acquires the captured images from the set of cameras 1 and/or the detection data from the ranging devices 2 to determine whether or not an obstacle exists around the vehicle. When an obstacle is detected, the process proceeds to step S109, while when no obstacle is detected, the process proceeds to step S112.

In step S109, the control device 10 controls the vehicle to make a stop in order to avoid contact between the vehicle and the obstacle. For example, the control device 10 acquires the distance from the vehicle to the obstacle detected in step S108 and calculates the deceleration for the target speed in accordance with the acquired distance. Then, the control device 10 forcibly reduces the target speed to stop the vehicle.

In step S110, the control device 10 controls the display 53 of the operation terminal 5 to present information that enables the transition to the rescue mode in order to allow the operator to select whether or not to transition to the rescue mode. For example, the display 53 displays information that the vehicle has stopped due to the detection of an obstacle and information that enables the transition to the rescue mode, and the operator can select the rescue mode and operate the enter button thereby to achieve the transition to the rescue mode. Transition to the rescue mode is followed by step S111, while no transition to the rescue mode is followed by step S112.

In step S111, the control device 10 starts control for making the vehicle stopped in step S109 leave the obstacle and the target parking position. The operation after the transition to the rescue mode will be described later.

On the other hand, when the parking route calculated in step S106 includes a position of turn for parking, the control device 10 makes a determination in step S112 as to whether or not the vehicle has reached the position of turn for parking. For example, the control device 10 makes the determination by comparing the current position of the vehicle with the position of turn for parking. When a determination is made that the vehicle has reached the position of turn for parking, the process proceeds to step S113, while when a determination is made that the vehicle has not reached the position of turn for parking, the process returns to step S108.

In step S113, the control device 10 executes a gear shift included in the control instruction. Thereafter, the control device 10 completes the parking control by continuously executing the control instruction in step S114. When the parking route calculated in step S106 does not include a position of turn for parking, steps S112 and S113 may be omitted.

Figure 6:
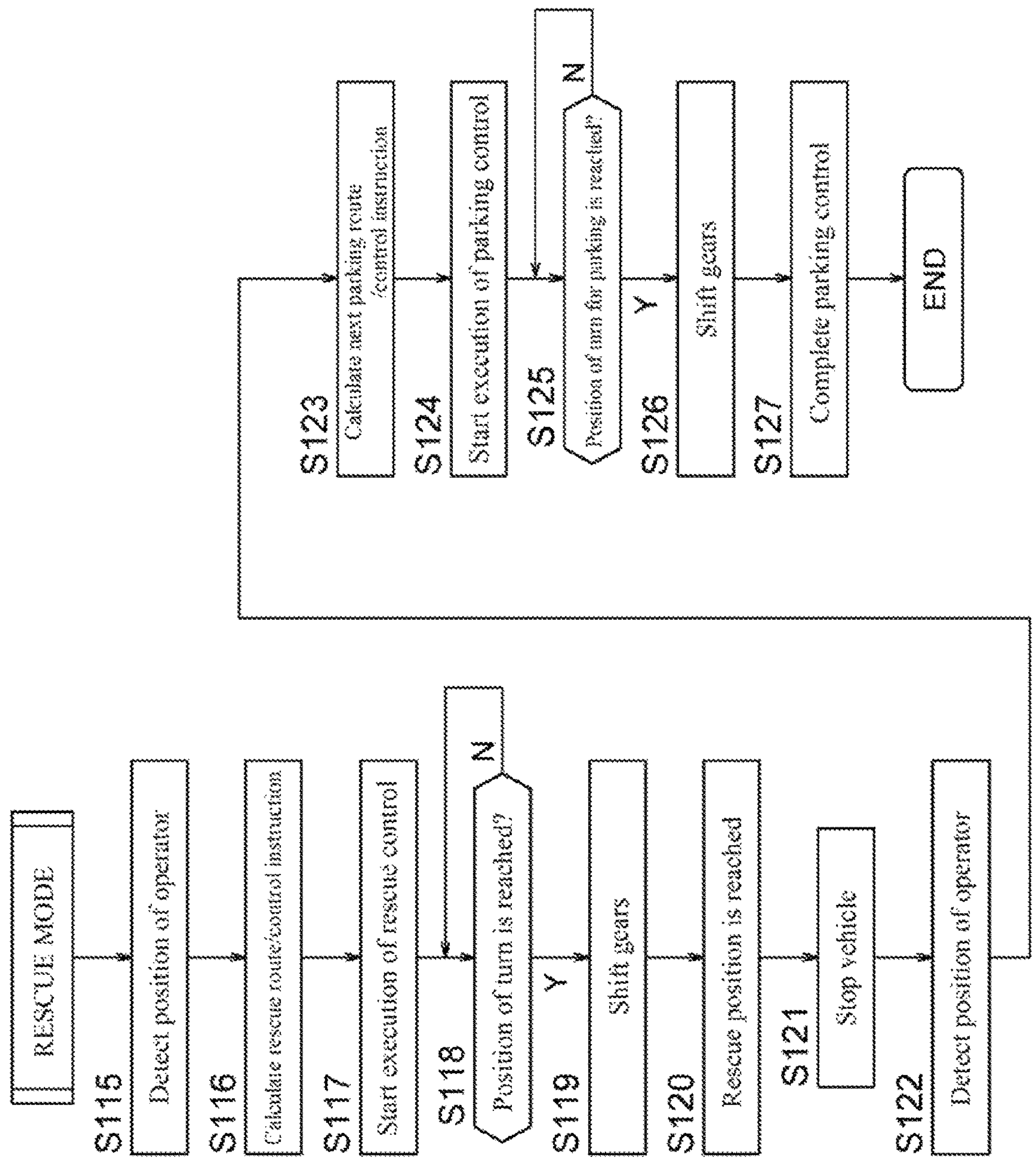
FIG. 6 is a flowchart illustrating an example of a control procedure in a rescue mode according to one or more embodiments of the present invention.

The control procedure in the rescue mode will then be described with reference to a flowchart illustrated in FIG. 6. When the execution of the rescue mode is determined by the operator in step S110 illustrated in FIG. 5, the control device 10 detects the position of the operator in step S115. The method of detecting the position of the operator may be the same method as the detection method in step S105 illustrated in FIG. 5 or may also be a different method.

In step S116, the control device 10 calculates the rescue route to the rescue position. First, the control device 10 specifies the next target parking position. For example, as in step S103, the control device 10 transmits the available parking spaces to the operation terminal 5, controls the display 53 of the operation terminal 5 to display the available parking spaces, and requests the operator to input the selection information of the next target parking position for parking the vehicle.

Then, the control device 10 specifies the next parking direction which is the parking direction when the vehicle is parked at the next target parking position. For example, the control device 10 generates a parking route for parking at the next target parking position. In the example of FIG. 4A, after specifying the parking lot PL2 as the next target parking position, the control device 10 generates the next parking route $R_{PL2}$ as the parking route for parking into the parking lot PL2. The control device 10 specifies the direction from the position of turn for parking included in the next parking route $R_{PL2}$ to the next target parking as the next parking direction (backward direction).

Then, the control device 10 calculates the moving direction of the vehicle on the basis of the next parking direction. For example, the control device 10 calculates the moving direction of the vehicle through setting the rescue position and generating the rescue route from the current position to the rescue position. In the example of FIG. 4A, the control device 10 sets the parking start position, which is the start position of the next parking route $R_{PL2}$, as the rescue position $P_R$ and calculates the rescue route $R_R$ to the rescue position $P_R$.

The present invention is not limited to specifying the next target parking position in the above step, and candidates for the target parking position may be preliminarily specified in another step. For example, when two or more available parking spaces are detected in step S102 illustrated in FIG. 5, priorities are assigned to the available parking spaces in accordance with a predetermined rule, and an available parking space other than the available parking space selected in step S103 may be determined as the next parking target position.

Moreover, the present invention is not limited to specifying the next parking direction from the next parking route and, as illustrated in FIG. 4B, the next parking direction may be specified based on the positional relationship between the target parking position and the next parking target position to calculate the rescue route. The control device 10 controls the display 53 of the operation terminal 5 to display the rescue route and encourages the operator to confirm it.

In step S117, the control device 10 starts execution of the rescue control when the operator confirms the rescue route and inputs the execution instruction to the operation terminal 5. This allows the vehicle to start moving along the rescue route toward the rescue position.

When the rescue route calculated in step S117 includes a position of turn, the control device 10 makes a determination in step S118 as to whether or not the vehicle has reached the position of turn. When a determination is made that the vehicle has reached the position of turn, the process proceeds to step S119, in which the control device 10 executes a gear shift included in the control instruction. On the other hand, when a determination is made that the vehicle has not reached the position of turn, the process waits in step S118 until the vehicle reaches the position of turn.

When the vehicle reaches the rescue position along the rescue route in step S120, the control device 10 controls the vehicle to make a stop in step S121. Then, in step S122, the control device 10 detects the position of the operator in order to start the parking control to the next target parking position.

In step S123, the control device 10 calculates the next parking route to the next target parking position. When the next parking route is preliminarily specified in step S116, the control device 10 may only calculate a control instruction for moving the vehicle along the next parking route. The control device 10 controls the display 53 of the operation terminal 5 to display the next parking route and encourages the operator to confirm it. In step S124, the control device 10 starts the execution of the parking control when the operator confirms the next parking route and inputs the execution instruction to the operation terminal 5.

Steps S125 to S127 correspond to steps S112 to S114 illustrated in FIG. 5, and the previous description is borrowed herein for the description of these steps. After the process of step S127 is completed, the vehicle is in a state of being parked at the next target parking position, and the parking control process is thus concluded.

As described above, the parking control method for a vehicle according to one or more embodiments of the present invention includes, when the parking control to the target parking position is suspended and the vehicle leaves the target parking position, calculating the rescue route on the basis of the parking direction when the vehicle is parked at the next target parking position and moving the vehicle along the rescue route. After moving along the rescue route, the vehicle makes a stop at a position that is determined by taking into account the parking at the next target parking position. For example, the vehicle makes a stop in a state in which the front part of the vehicle faces the next target parking position. This allows the operator of the operation terminal 5 to smoothly park the vehicle at the next target parking position by the remote operation or driving and it is therefore possible to prevent the operator of the operation terminal 5 from giving an instruction or the like for the next parking direction and alleviate the burden imposed on the operator of the operation terminal 5.

In the parking control method for a vehicle according to one or more embodiments of the present invention, the next target parking position is specified and the rescue position, to which the vehicle moves, is calculated based on the specified next target parking position. Then, the vehicle is moved along the rescue route ending at the rescue position. The rescue position is an evacuation position for temporarily leaving the initial target parking position and is, for example, a position close to the next target parking position. This allows the vehicle to evacuate from the initial target parking position and come close to the next target parking position. As a result, the parking control to the next target parking position can be smoothly executed.

In the parking control method for a vehicle according to one or more embodiments of the present invention, a position at which the vehicle starts the parking control to the next target parking position is calculated as the rescue position. This allows the parking control to the next target parking position to be smoothly executed.

In the parking control method for a vehicle according to one or more embodiments of the present invention, the next parking route for the vehicle to move to the next target parking position is specified, and the next parking direction is specified from the direction along the next parking route. For example, the parking control apparatus 100 can specify the next parking route by calculating the parking route corresponding to the set next parking target position. This allows the vehicle to move to a position that is determined by taking into account the next parking direction, and the parking control to the next target parking position can be smoothly executed.

In the parking control method for a vehicle according to one or more embodiments of the present invention, the next parking direction is specified from the direction toward the next target parking position from the initial target parking position. For example, when the next target parking position is located at a position facing the target parking position across a passage, the direction in which the vehicle faces the next target parking position can be specified as the next parking direction. When the rear part of the vehicle faces the next target parking position, the backward direction is specified as the next parking direction, while when the front part of the vehicle faces the next target parking position, the forward direction is specified as the next parking direction. This allows the next parking direction to be easily specified, and the parking control to the next target parking position can be smoothly executed.

In the parking control method for a vehicle according to one or more embodiments of the present invention, when the next parking route includes a position of turn for parking, the next parking direction is specified from the direction toward the next target parking position from the position of turn for parking. This allows the next parking direction to be easily specified even for a complicated route such as the next target parking route including a position of turn for parking, and the parking control to the next target parking position can be smoothly executed.

In the parking control method for a vehicle according to one or more embodiments of the present invention, the next parking direction is specified based on the next target parking position and the direction of the vehicle at the position at which the parking control to the target parking position is suspended. For example, when the available parking space, which is the next target parking position, is arranged in parallel with other parking spaces and the vehicle makes a stop with its rear part facing the next target parking position, a determination is made that the vehicle can be easily parked at the next target parking position by moving backward while maintaining the direction of the vehicle, and the backward direction is specified as the next parking direction. This allows the parking control to the next target parking position to be smoothly executed.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the above-described embodiments, the present invention has been described by exemplifying a case in which the parking control apparatus 100 detects or has preliminarily detected the next available parking space when the vehicle leaves the initial target parking position, but the present invention may not have to assume the detection of the next available parking space.

Figure 7:
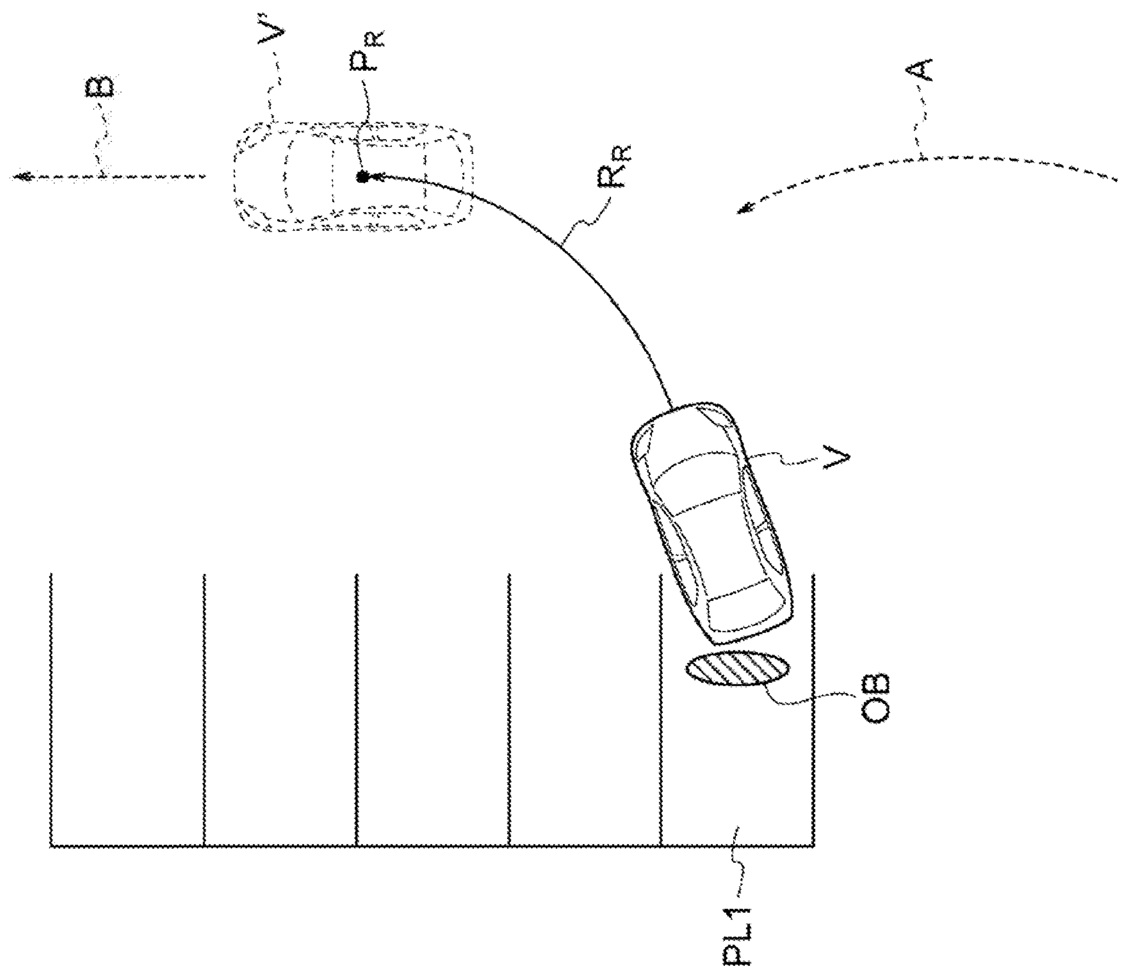
FIG. 7 is a diagram for describing the operation in a fourth rescue mode as an example of the operation in a rescue mode according to one or more embodiments of the present invention.

An example of the operation in the rescue mode when the next available parking space is not detected or has not been preliminarily detected will be described with reference to FIG. 7. As in FIG. 4A to FIG. 4C, FIG. 7 illustrates a scene in which the obstacle OB is detected while the parking control apparatus 100 is executing the parking control for parking the vehicle V backward into the parking lot PL1. In this scene, the control device 10 determines that the vehicle V cannot be parked into the parking lot PL1, and determines the transition to the rescue mode on the basis of an operation command from the operator. In the example illustrated in FIG. 7, it is assumed that the parking control apparatus 100 has not detected the next available parking space. In FIG. 7, it is also assumed that the vehicle V has traveled from the direction indicated by the arrow (A direction) and has arrived at the vicinity of the parking lot PL1. In other words, it is assumed that the vehicle V has not traveled in the direction B opposite to the direction A before starting the parking control into the parking lot PL1.

In the example of FIG. 7, the next target parking position which is an available parking space is not specified, and the control device 10 therefore generates a rescue route in a direction different from the direction A and in a direction in which the vehicle can move. First, the control device 10 specifies a direction in which vehicle V has not traveled before arriving at the vicinity of the parking lot PL1. For example, the control device 10 can refer to the travel history of the vehicle V to specify the direction in which vehicle V has not traveled before arriving at the vicinity of the parking lot PL1. In the example of FIG. 7, the control device 10 specifies the direction B as the direction in which the vehicle V has not traveled. The control device 10 can comprehensively take into account the structure of the parking facility (such as positions of walls and passages), the location of the parking lot PL1, etc. to determine whether or not the direction of interest is a direction in which the vehicle can move.

Then, the control device 10 sets the rescue position $P_R$ as a position to evacuate from the parking lot PL1 in the direction toward the direction B and generates the rescue route $R_R$ from the current position of the vehicle V to the rescue position $P_R$. In the example of FIG. 7, the rescue route $R_R$ is indicated by a curved route for the vehicle V to move to the left side while moving forward. The control device 10 calculates a target steering angle and a target speed for moving the vehicle V to the rescue position $P_R$ along the rescue route $R_R$ and outputs the calculated target steering angle and target speed to the vehicle controller 70. The vehicle V can move to the rescue position $P_R$ thereby to evacuate from the obstacle OB and the parking lot PL1. In the example of FIG. 7, the state of the vehicle V after moving to the rescue position $P_R$ is indicated as a vehicle V'.

Thus, in the parking control method for a vehicle according to one or more embodiments of the present invention, when the next target parking position is not specified, before the parking control to the target parking position is started, the rescue route is generated in the direction toward a direction in which the vehicle has not traveled and in the direction in which the vehicle can move. Then, the vehicle is moved along the rescue route. Through this operation, even when the next available parking space is not specified, the vehicle can move in a direction different from the direction in which the vehicle has traveled until then, and the parking control apparatus 100 can therefore easily specify the next available parking space.

Additionally or alternatively, when the vehicle leaves the initial target parking position, for example, the parking control apparatus 100 may take into account the operability of the operation terminal 5 to specify the next available parking space.

Figure 8A:
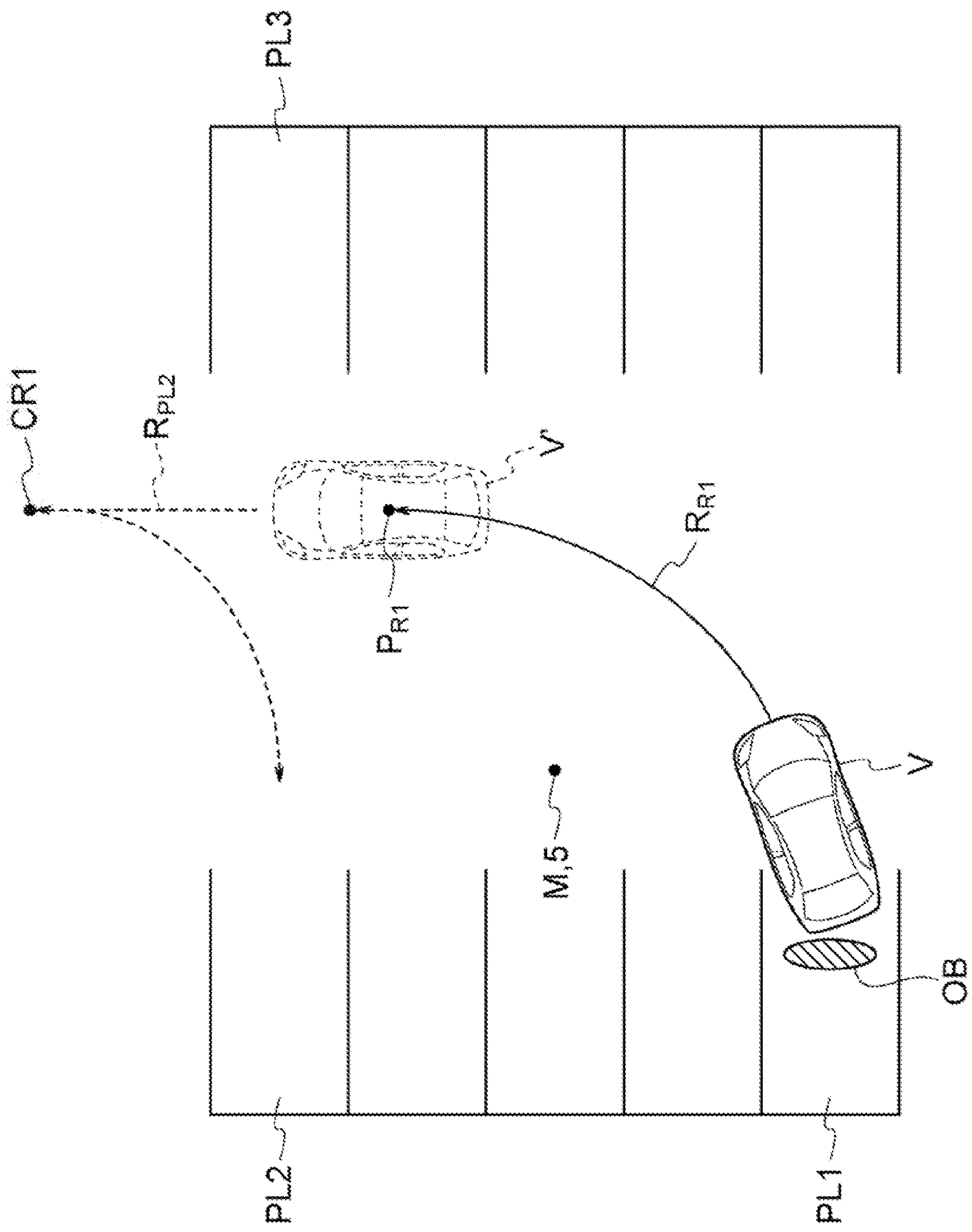
FIG. 8A is a diagram for describing the operation in a fifth rescue mode as an example of the operation in a rescue mode according to one or more embodiments of the present invention.

An example of the operation in the rescue mode of specifying the next available parking space with consideration for the operability of the operation terminal 5 will be described with reference to FIGS. 8A and 8B. As in FIG. 4A, FIG. 8A illustrates a scene in which the obstacle OB is detected while the parking control apparatus 100 is executing the parking control for parking the vehicle V backward into the parking lot PL1. In this scene, the control device 10 determines that the vehicle V cannot be parked into the parking lot PL1, and determines the transition to the rescue mode on the basis of an operation command from the operator. It is assumed that the parking control apparatus 100 has detected parking lots PL2 and PL3 as candidates for the next target parking position.

In the example of FIG. 8A, the control device 10 takes into account the operability for the operator M to specify one next target parking position from among a plurality of candidates for the next target parking position with reference to the relationship between the position of the operator M and the position of the parking lot. Specifically, the control device 10 selects a parking lot with high visibility from the position of the operator M as the next target parking position from among a plurality of candidates for the next target parking position. Regarding whether or not the visibility is high, for example, when the distance between the operator and the parking lot is short, a determination may be made that the visibility may be high, and when an obstacle exists between the operator and the parking lot, a determination may be made that the visibility may be low. The determination as to whether or not the visibility is high is not limited to the above-described example. For example, the determination may be made with consideration for the angle of the parking lot viewed from the operator M using a three-dimensional position, such as the height, of the eyes of the operator M.

For example, the control device 10 detects the position of the operator M from the positional information of the operation terminal 5 and compares the positional relationship between the operator M and the parking lot PL2 with the positional relationship between the operator M and the parking lot PL3 to specify a parking lot with high visibility from the position of the operator M as the next target parking position. In the example of FIG. 8A, the distance between the operator M and the parking lot PL2 is shorter than the distance between the operator M and the parking lot PL3, and the control device 10 therefore determines that the operator M is located closer to the parking lot PL2 than to the parking lot PL3, and specifies the parking lot PL2 as the next target parking position.

Then, the control device 10 generates a parking route for parking into the parking lot PL2 and sets the generated parking route as the next parking route $R_{PL2}$. The control device 10 sets a rescue position $P_{R1}$ at a position on the next parking route $R_{PL2}$ and generates a rescue route $R_{R1}$ as the route for the vehicle V to move from the current position to the rescue position $P_{R1}$. The control device 10 outputs a target steering angle and a target speed for moving the vehicle V along the rescue route $R_{R1}$ to the vehicle controller 70. The vehicle V is moved by the vehicle controller 70 along the rescue route $R_{R1}$. In the example of FIG. 8A, the state of the vehicle V after moving to the rescue position $P_{R1}$ is indicated as a vehicle V'.

After the vehicle V moves to the rescue position $P_{R1}$, the operator M of the operation terminal 5 can achieve execution of the parking control to the parking lot PL2 and park the vehicle V' smoothly backward into the parking lot PL2 along the next parking route $R_{PL2}$. During this operation, the operator M can confirm that the vehicle V' moves to the parking lot PL2 close to the position of the operator M in a state in which the visibility is ensured.

Figure 8B:
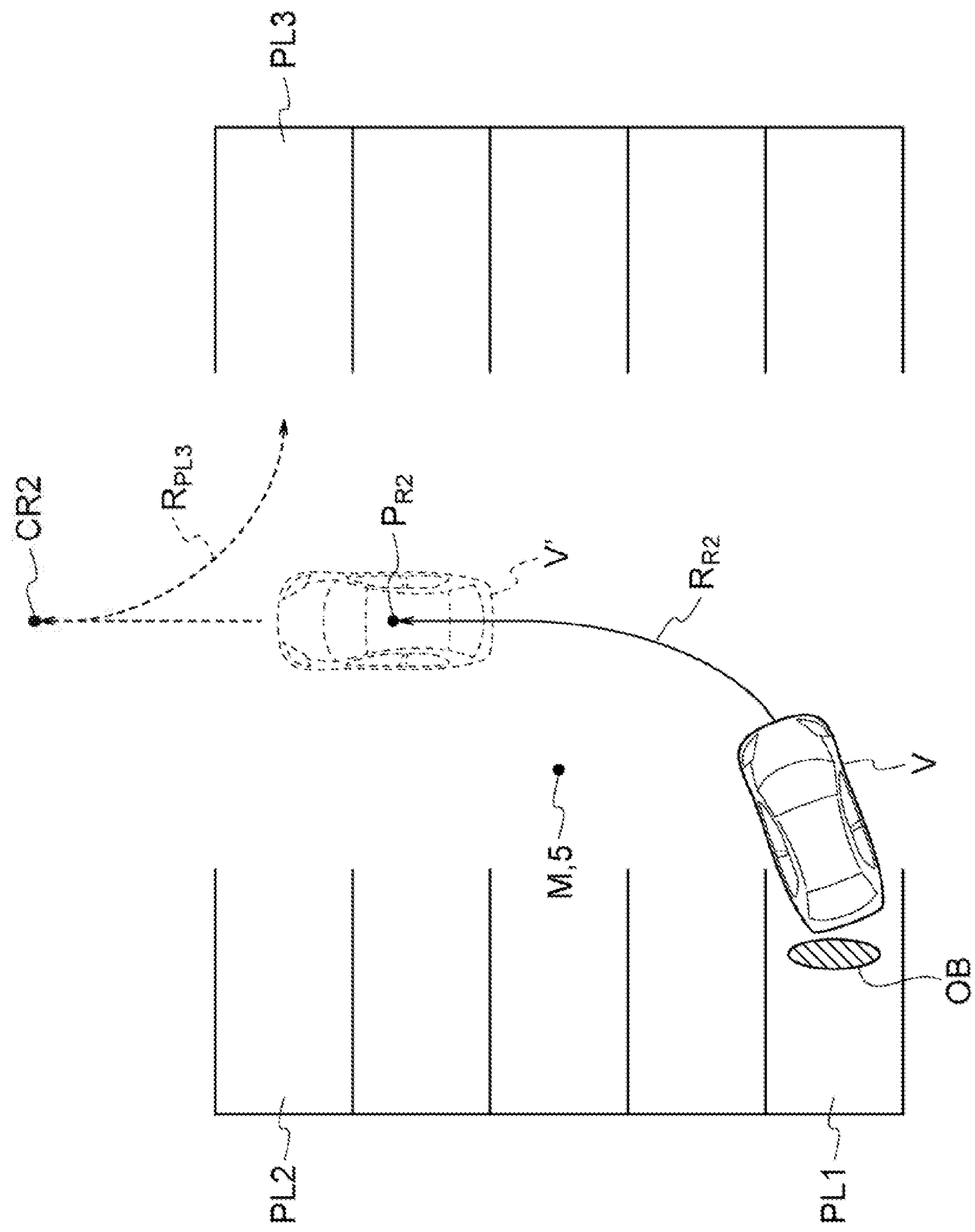
FIG. 8B is a diagram for describing an example of the operation in a rescue mode according to a comparative example.

On the other hand, FIG. 8B illustrates a scene in which the parking lot PL3 is specified as the next target parking position by the control device of a comparative example. In this case, the control device of the comparative example generates a parking route for parking into the parking lot PL3 and sets the generated parking route as the next parking route $R_{PL3}$. The control device of the comparative example sets a rescue position $P_{R2}$ at a position on the next parking route $R_{PL3}$ and generates a rescue route $R_{R2}$ as the route for the vehicle V to move from the current position to the rescue position $P_{R2}$. The control device of the comparative example outputs a target steering angle and a target speed for moving the vehicle V along the rescue route $R_{R2}$ to the vehicle controller 70. The vehicle V is moved by the vehicle controller 70 along the rescue route $R_{R2}$. In the example of FIG. 8B, the state of the vehicle V after moving to the rescue position $P_{R2}$ is indicated as a vehicle V'.

After the vehicle V moves to the rescue position $P_{R2}$, the operator M of the operation terminal 5 can achieve execution of the parking control to the parking lot PL3 and park the vehicle V' backward into the parking lot PL3 along the next parking route $R_{PL3}$. However, the parking lot PL3 is farther than the parking lot PL2 from the operator M; therefore, the visibility for the operator M is not ensured, and the operator M may approach the parking lot PL3, for example, from the position illustrated in the example of FIG. 8B. In this case, the operator M has to move to park the vehicle into the parking lot PL3 which is the next target parking position and, as a result, a burden may be imposed on the operator M.

In contrast, as described with reference to FIG. 8A, when the parking lot PL2 is set as the next parking target position by the control device 10 according to one or more embodiments of the present invention, the operator M can confirm that the vehicle V' moves to the parking lot PL2 in a state in which the visibility is ensured. This can reduce unnecessary movement of the operator M for parking the vehicle at the next target parking position and, as a result, the burden imposed on the operator M can be alleviated.

Moreover, in the above-described embodiments, for example, the present invention has been described by exemplifying a case in which the map information 133 and the parking lot information 134 are stored in the storage device 132 of the information server 3, but the present invention is not limited to this. For example, such information may be stored in the ROM 12 or RAM 13 of the parking control apparatus 100.

DESCRIPTION OF REFERENCE NUMERALS

1000 Parking control system
100 Parking control apparatus
10 Control device
11 CPU
12 ROM
13 RAM
20 Input device
21 Communication device
211 Antennas
30 Output device
31 Display
1*a*-1*d* Cameras
2 Ranging devices
3 Information server
131 Communication device
132 Storage device
133 Map information
134 Parking lot information
5 Operation terminal
51 Communication device
511 Antenna
52 Input device
53 Display
200 Onboard apparatus
40 Drive system
50 Steering angle sensor
60 Vehicle speed sensor
70 Vehicle controller
71 CPU
72 ROM
73 RAM

The invention claimed is:

1. A parking control method comprising:
detecting a target parking position that is open;
receiving an operation command from an operator located outside of the vehicle to start moving the vehicle;
calculating a target parking route on a basis of the operation command;
performing a parking control of the vehicle to move the vehicle to the target parking position along the target parking route on a basis of the operation command;
detecting whether an obstacle is present in the target parking position as the vehicle enters the target parking position;
when an obstacle is detected, suspending movement of the vehicle to the target parking position at a suspended position to set a rescue position;
generating a next parking route to the next target parking position;
setting the rescue position of the vehicle that is based on parking the vehicle in a next target parking position along the next parking route;
setting a rescue route that is forward or backward from the suspended position to the rescue position; and
performing a rescue control of the vehicle to move the vehicle in a forward or backward direction away from the detected obstacle in the target parking position along the rescue route to the rescue position.

2. The parking control method according to claim 1, comprising:
calculating a target position to which the vehicle moves, on a basis of the next target parking position; and
moving the vehicle to the target position.

3. The parking control method according to claim 2, comprising calculating as the target position the rescue position at which the vehicle starts the parking control to the next target parking position.

4. The parking control method according to claim 1, comprising:
specifying the next parking route for the vehicle to park at the next target parking position; and
specifying a parking direction from a direction along the next parking route.

5. The parking control method according to claim 4, comprising specifying the parking direction from a direction toward the next target parking position from the target parking position.

6. The parking control method according to claim 1, comprising:
specifying the next parking route for the vehicle to park at the next target parking position; and
when the parking route includes a position of turn for parking at which the vehicle turns for parking, specifying the parking direction from a direction toward the next target parking position from the position of turn for parking.

7. The parking control method according to claim 1, comprising
specifying the parking direction on a basis of the next target parking position and a direction of the vehicle at a position at which the parking control to the target parking position is suspended.

8. The parking control method according to claim 1, comprising, when the next target parking position is not specified, calculating as the moving direction a direction in which the vehicle can move, the direction being a direction toward a direction in which the vehicle has not traveled before start of the parking control to the target parking position.

9. The parking control method according to claim 1, comprising:

specifying a position of the operator; and selecting from among one or more candidates for the next target parking position a candidate observable from the operator as the next target parking position.

10. A parking control apparatus comprising a control device configured to perform parking control of moving a vehicle to a target parking position on a basis of an operation command acquired from an operator located outside the vehicle, the control device operating to:

detect the target parking position that is open;

receive the operation command;

calculate a target parking route on a basis of the operation command;

perform a parking control of the vehicle to move the vehicle to the target parking position along the target parking route on a basis of the operation command;

detect whether an obstacle is present in the target parking position as the vehicle enters the target parking position;

when an obstacle is detected, suspend movement of the vehicle to the target parking position at a suspended position to set a rescue position;

generate a next parking route to the next target parking position;

set the rescue position of the vehicle that is based on parking the vehicle in a next target parking position along the next parking route;

set a rescue route that is forward or backward from the suspended position to the rescue position; and perform a rescue control of the vehicle to move the vehicle in a forward or backward direction away from the detected obstacle in the target parking position along the rescue route to the rescue position.

* * * * *